US011884070B2

(12) United States Patent
Amano et al.

(10) Patent No.: US 11,884,070 B2
(45) Date of Patent: Jan. 30, 2024

(54) LIQUID DISCHARGING APPARATUS

(71) Applicant: SEIKO EPSON CORPORATION, Tokyo (JP)

(72) Inventors: Atsushi Amano, Nagano (JP); Toru Matsuyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 150 days.

(21) Appl. No.: 17/656,669

(22) Filed: Mar. 28, 2022

(65) Prior Publication Data

US 2022/0314602 A1 Oct. 6, 2022

(30) Foreign Application Priority Data

Mar. 30, 2021 (JP) ................................ 2021-058294

(51) Int. Cl.
*B41J 2/045* (2006.01)

(52) U.S. Cl.
CPC ......... *B41J 2/0459* (2013.01); *B41J 2/04541* (2013.01); *B41J 2/04581* (2013.01)

(58) Field of Classification Search
CPC .. B41J 2/04541; B41J 2/04588; B41J 2/0455; B41J 2/04501
See application file for complete search history.

(56) References Cited

U.S. PATENT DOCUMENTS

| | | | | |
|---|---|---|---|---|
| 2015/0246531 A1* | 9/2015 | Abe | ..................... | B41J 2/04541 347/9 |
| 2016/0167370 A1* | 6/2016 | Uematsu | ............ | H03K 17/6871 347/68 |
| 2017/0001435 A1* | 1/2017 | Nozawa | ............... | B41J 2/04581 |
| 2017/0111042 A1* | 4/2017 | Yamada | ............... | B41J 2/04588 |

FOREIGN PATENT DOCUMENTS

| | | |
|---|---|---|
| JP | 2018-108739 A | 7/2018 |

* cited by examiner

*Primary Examiner* — Scott A Richmond
(74) *Attorney, Agent, or Firm* — Global IP Counselors, LLP

(57) ABSTRACT

Provided is a liquid discharging apparatus including a drive signal output circuit that displaces between a first potential and a second potential, and a discharging portion discharging liquid, in which the drive signal output circuit includes a modulation circuit, an amplification circuit, and a demodulation circuit that includes a first capacitor and a second capacitor and outputs a drive signal, the first potential is 25 V or higher, the first capacitor and the second capacitor are coupled to each other in parallel, a change rate of an electrostatic capacitance of the first capacitor when a direct-current voltage is supplied to the first capacitor is smaller than a change rate of an electrostatic capacitance of the second capacitor when the direct-current voltage is supplied to the second capacitor, and an equivalent series resistance component of the second capacitor is smaller than an equivalent series resistance component of the first capacitor.

8 Claims, 17 Drawing Sheets

| [SIH, SIL] | | [1, 1] (LD) | [1, 0] (MD) | [0, 1] (SD) | [0, 0] (ND) |
|---|---|---|---|---|---|
| S1 | T1 | H | H | H | L |
| | T2 | H | L | L | L |
| S2 | T1 | L | L | L | H |
| | T2 | L | H | L | L |

LIQUID DISCHARGING APPARATUS

The present application is based on, and claims priority from JP Application Serial Number 2021-058294, filed Mar. 30, 2021, the disclosure of which is hereby incorporated by reference herein in its entirety.

BACKGROUND

1. Technical Field

The present disclosure relates to a liquid discharging apparatus.

2. Related Art

A liquid discharging apparatus such as an ink jet printer that prints an image or a document on a medium by discharging ink as liquid is known to use a piezoelectric element such as a piezo element. The piezoelectric element is provided corresponding to each of a plurality of nozzles in a head unit. Each of a plurality of piezoelectric elements is driven in response to a drive signal so that a predetermined amount of ink is discharged from the corresponding nozzle at a predetermined timing. Such a piezoelectric element is a capacitive load like a capacitor when viewed electrically, and in order to drive the piezoelectric element, it is necessary to supply a sufficient current to the piezoelectric element. Particularly, in a case of a liquid discharging apparatus such as an ink jet printer having a large number of nozzles, the liquid discharging apparatus has a large number of piezoelectric elements corresponding to a large number of nozzles so that the amount of current required to operate the piezoelectric elements becomes very large. Therefore, in the liquid discharging apparatus, a drive signal output circuit that outputs a drive signal for driving the piezoelectric element needs to output a drive signal including a sufficient current to the piezoelectric element and is configured to include, for example, an amplification circuit or the like.

JP-A-2018-108739 discloses a liquid discharging apparatus including a drive circuit that includes a class D amplification circuit capable of reducing power consumption as a drive circuit (drive signal output circuit) including an amplification circuit.

However, in recent years, there has been an increasing demand for acceleration of the image formation speed and improvement of the discharge accuracy for liquid discharging apparatuses. In this regards, the liquid discharging apparatus described in JP-A-2018-108739 is not sufficient and there is room for further improvement.

SUMMARY

One aspect of a liquid discharging apparatus according to the present disclosure includes: a drive signal output circuit outputting a drive signal that displaces between a first potential and a second potential that is lower than the first potential; and a discharging portion including a piezoelectric element that is driven based on the drive signal and discharging liquid by a drive of the piezoelectric element, in which the drive signal output circuit includes a modulation circuit that outputs a modulation signal obtained by modulating a base drive signal that is a base of the drive signal, an amplification circuit that outputs an amplified modulation signal obtained by amplifying the modulation signal, and a demodulation circuit that includes a first capacitor and a second capacitor and outputs the drive signal obtained by demodulating the amplified modulation signal, the first potential is 25 V or higher, the first capacitor and the second capacitor are coupled to each other in parallel, a change rate of an electrostatic capacitance of the first capacitor when a direct-current voltage is supplied to the first capacitor is smaller than a change rate of an electrostatic capacitance of the second capacitor when the direct-current voltage is supplied to the second capacitor, and an equivalent series resistance component of the second capacitor is smaller than an equivalent series resistance component of the first capacitor.

DESCRIPTION OF EXEMPLARY EMBODIMENTS

Hereinafter, preferred embodiments of the present disclosure will be described with reference to the drawings. The drawings used are for convenience of explanation. Note that the embodiments described below do not unduly limit the contents of the present disclosure described in the aspects.

Further, not all of the components described below are necessarily essential component requirements of the present disclosure.

1. Configuration of Liquid Discharging Apparatus

Figure 1:
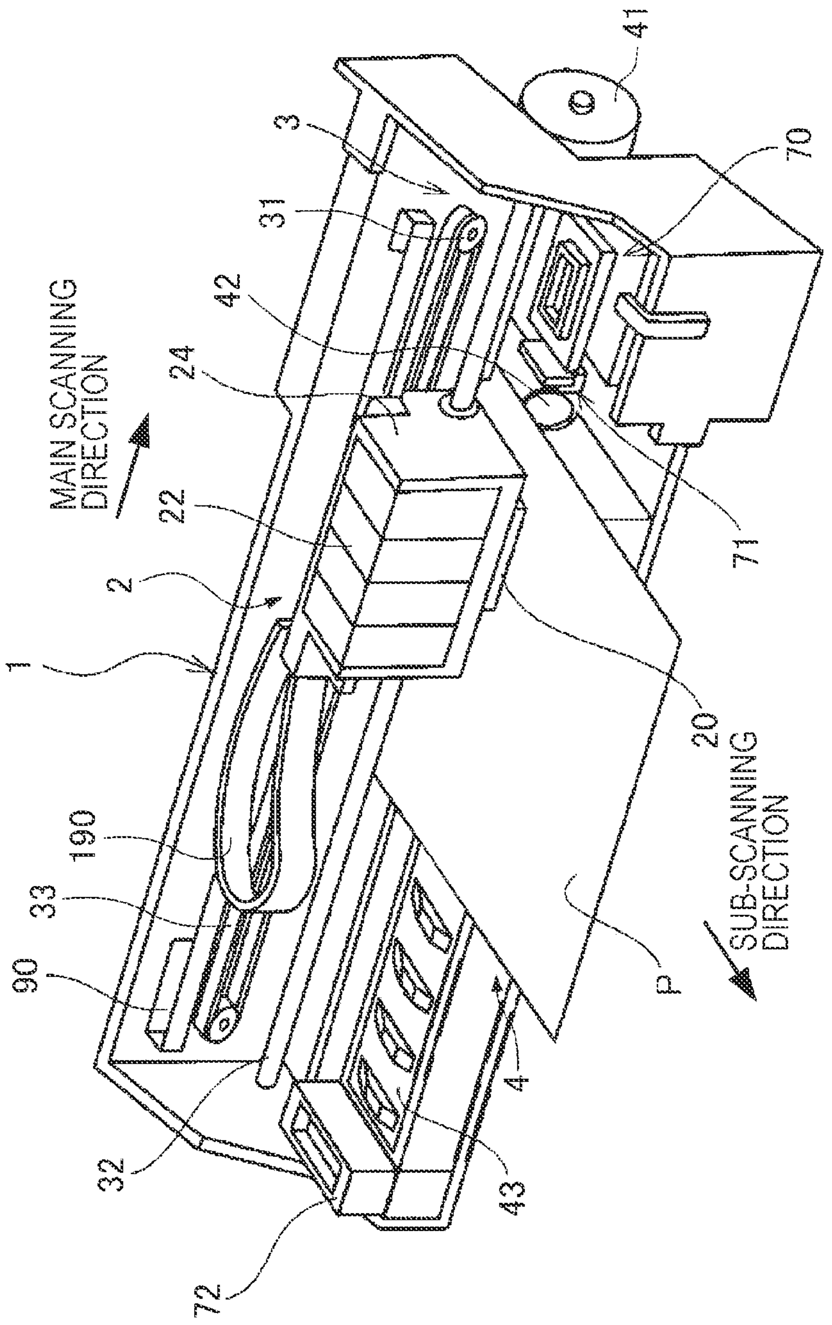
FIG. 1 is a view illustrating a schematic configuration inside a liquid discharging apparatus.

FIG. 1 is a view illustrating a schematic configuration inside a liquid discharging apparatus 1 of the present embodiment. The liquid discharging apparatus 1 forms dots on a medium P such as paper by discharging ink, as an example of liquid, according to image data supplied from a host computer provided externally and is an ink jet printer that prints an image in accordance with the image data supplied thereby. In FIG. 1, a part of the configuration of the liquid discharging apparatus 1 such as a housing or a cover is omitted.

As illustrated in FIG. 1, the liquid discharging apparatus 1 includes a movement mechanism 3 for moving a carriage 24 on which a head unit 2 is mounted in a main scanning direction. The movement mechanism 3 has a carriage motor 31 that is a driving source of the head unit 2, a carriage guide shaft 32 that is fixed at both ends, and a timing belt 33 that extends substantially parallel to the carriage guide shaft 32 and is driven by the carriage motor 31. Further, the movement mechanism 3 includes a linear encoder 90 for detecting a position of the head unit 2 in the main scanning direction.

The head unit 2 is mounted on the carriage 24. Further, the carriage 24 is configured such that a predetermined number of ink cartridges 22 can be mounted. The carriage 24 is reciprocally supported by a carriage guide shaft 32 and is fixed to a part of a timing belt 33. Therefore, by driving the timing belt 33 forward and reverse by a carriage motor 31, the carriage 24 is guided by the carriage guide shaft 32 and reciprocates along the main scanning direction. That is, the carriage motor 31 moves the carriage 24 in the main scanning direction. Further, a print head 20 is attached to a part of the carriage 24 facing the medium P. As will be described later, the print head 20 has a large number of nozzles and discharges a predetermined amount of ink from each nozzle at a predetermined timing. Various control signals are supplied to the head unit 2 that operates as described above via a cable 190 such as a flexible flat cable.

Further, the liquid discharging apparatus 1 includes a transport mechanism 4 for transporting the medium P along a sub-scanning direction intersecting the main scanning direction. The transport mechanism 4 includes a platen 43 that supports the medium P, a transporting motor 41 that is a driving source, and a transporting roller 42 that transports the medium P in the sub-scanning direction by being rotated by the transporting motor 41. Thereafter, in a state where the medium P is supported by the platen 43, a desired image is formed on a surface of the medium P by discharging ink from the print head 20 to the medium P in accordance with the timing at which the medium P is transported by the transport mechanism 4. The sub-scanning direction, in which the medium P is transported, corresponds to a transporting direction in which the medium P is transported.

Further, a home position, which is a base point for movement of the carriage 24, is set in an end portion region within a movement range of the carriage 24. At the home position, a capping member 70 that seals a nozzle forming surface of the print head 20 and a wiper member 71 for wiping the nozzle forming surface are disposed. The liquid discharging apparatus 1 forms an image on the surface of the medium P in both directions of a forward movement time when the carriage 24 moves from this home position toward an end portion on the opposite side thereof and a backward movement time when the carriage 24 moves from the end portion on the opposite thereof toward the home position side.

A flushing box 72 that collects the ink discharged from the print head 20 during a flushing operation is disposed at an end portion, which is an opposite side from the home position where the carriage 24 is moved, that is an end portion of the platen 43 on the main scanning direction side. The flushing operation is an operation of forcibly discharging the ink from each nozzle regardless of the image data to prevent the risk of not discharging the appropriate amount of ink because the nozzle is clogged due to the thickening of the ink near the nozzle, and the air bubbles are mixed into the nozzle. The flushing box 72 may be provided at both end portions of the platen 43 in the main scanning direction.

As described above, in the liquid discharging apparatus 1 of the present embodiment, the transport mechanism 4 transports the medium P along the sub-scanning direction, and the carriage 24 on which the head unit 2 is mounted reciprocates along the main scanning direction intersecting the sub-scanning direction. In synchronization with the transport of the medium P and the reciprocating movement of the carriage 24, the print head 20 that is included in the head unit 2 mounted on the carriage 24 discharges the ink to the medium P so that the ink can be landed at a desired position of the medium P. As a result, the desired image is formed on the medium P.

2. Electrical Configuration of Liquid Discharging Apparatus

Figure 2A:
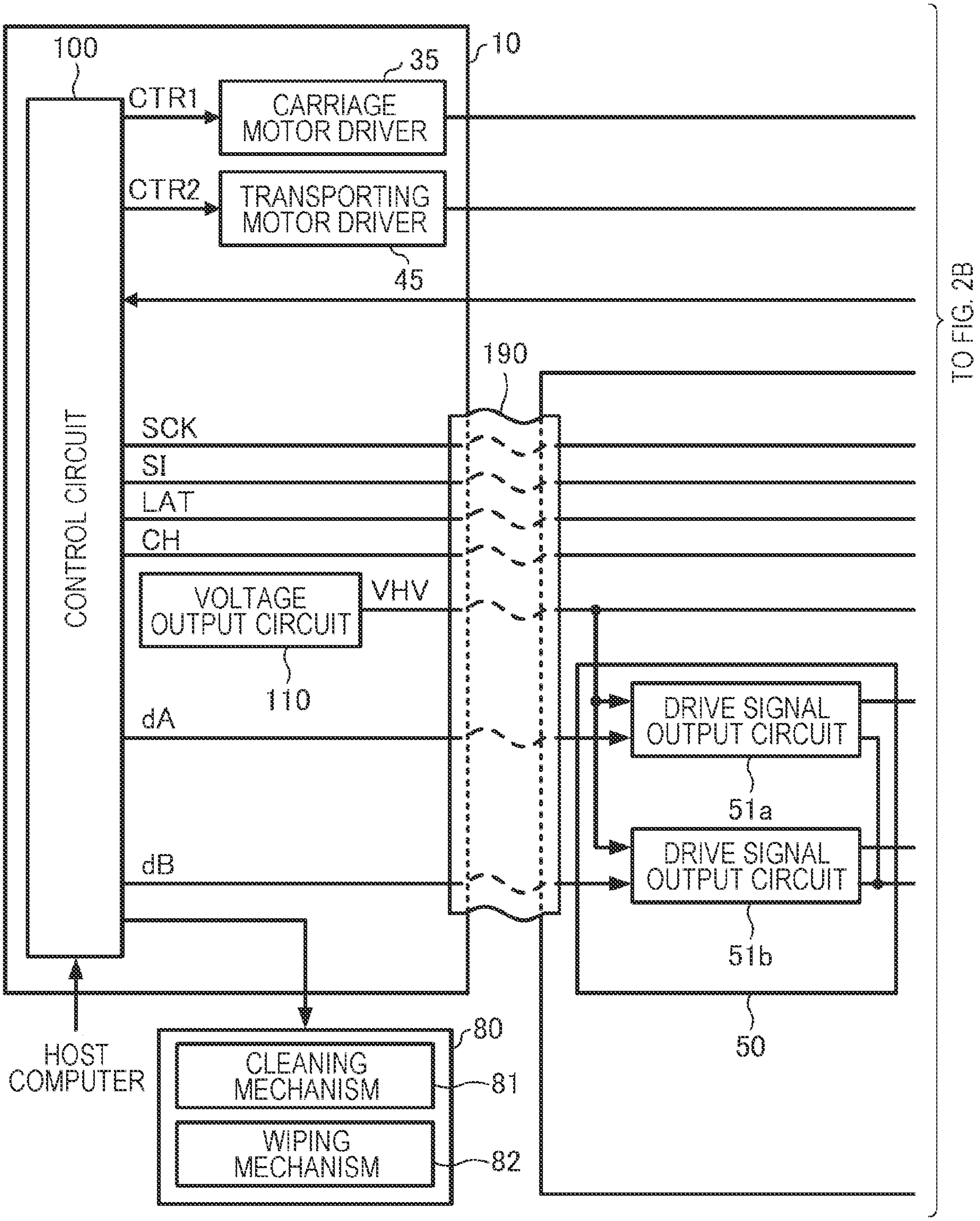
FIGS. 2A and 2B are a view illustrating a functional configuration of the liquid discharging apparatus.
Figure 2B:
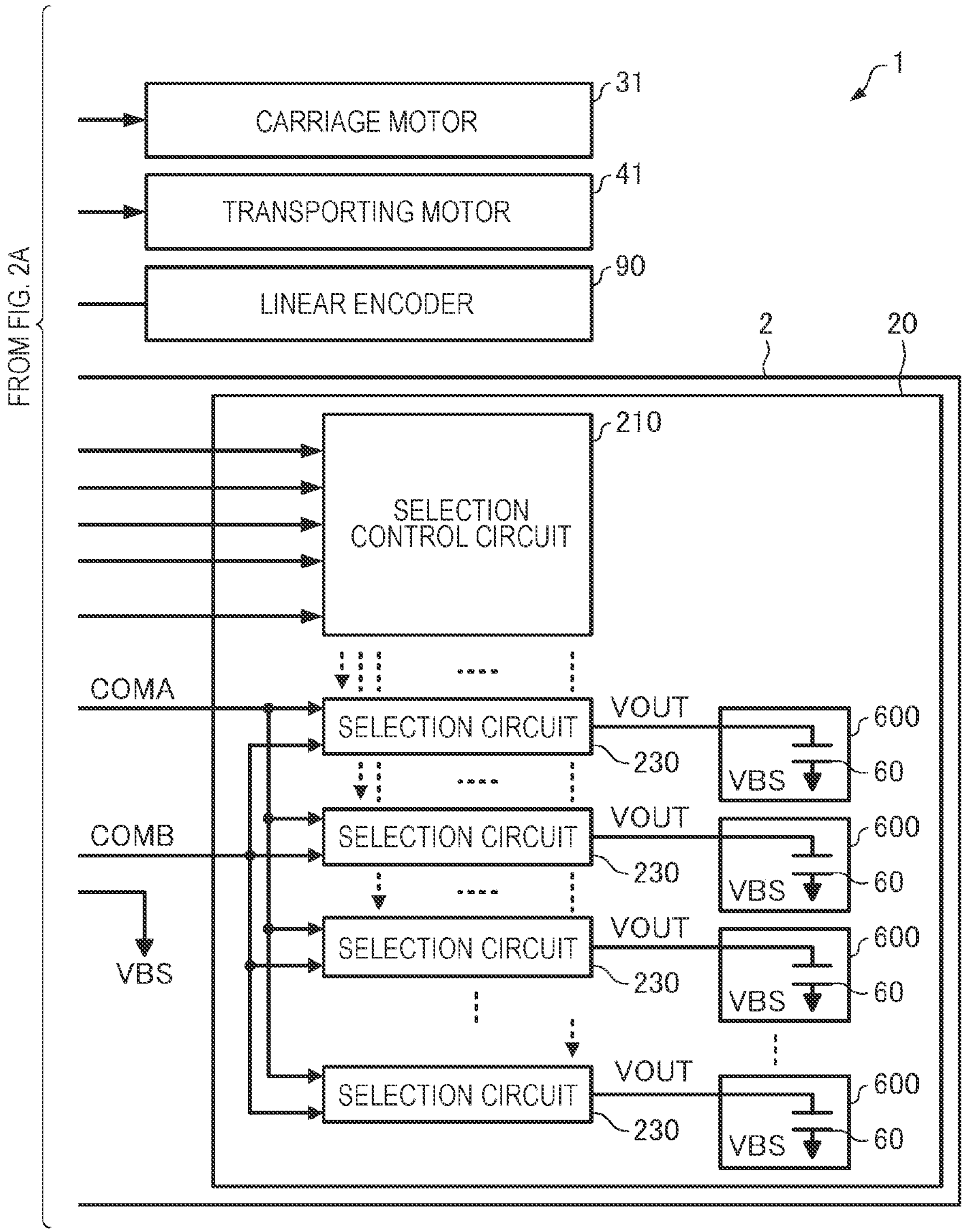

FIGS. 2A and 2B are a view illustrating a functional configuration of the liquid discharging apparatus 1. As illustrated in FIGS. 2A and 2B, the liquid discharging apparatus 1 has a control unit 10 and a head unit 2. The control unit 10 and the head unit 2 are electrically coupled to each other via the cable 190.

The control unit 10 has a control circuit 100, a carriage motor driver 35, a transporting motor driver 45, and a voltage output circuit 110. The control circuit 100 generates various control signals in accordance with the image data supplied from the host computer and outputs the control signals to the corresponding configurations.

Specifically, the control circuit 100 ascertains the current scanning position of the head unit 2 based on the detection signal of the linear encoder 90. The control circuit 100 generates control signals CTR1 and CTR2 in accordance with the current scanning position of the head unit 2. The control signal CTR1 is supplied to the carriage motor driver 35. The carriage motor driver 35 drives the carriage motor 31 in response to the input control signal CTR1. Further, the control signal CTR2 is supplied to the transporting motor driver 45. The transporting motor driver 45 drives the transporting motor 41 in response to the input control signal CTR2. As a result, the reciprocating movement of the carriage 24 in the main scanning direction and the transport of the medium P in the sub-scanning direction are controlled.

Further, based on the image data supplied from the host computer provided externally and the detection signal output by the linear encoder 90, the control circuit 100 generates a clock signal SCK, a print data signal SI, a latch signal LAT, a change signal CH, and base drive signals dA and dB obtained in accordance with the current scanning position of the head unit 2, and outputs the signals to the head unit 2.

Further, the control circuit 100 causes a maintenance unit 80 to execute a maintenance process of recovering the discharging state of the ink in the discharging portion 600 to a normal state. The maintenance unit 80 has a cleaning mechanism 81 and a wiping mechanism 82. As the maintenance process, the cleaning mechanism 81 performs a pumping process of sucking thickened ink, air bubbles, or the like stored inside the discharging portion 600 by a tube pump (not illustrated). Further, as the maintenance process, the wiping mechanism 82 performs a wiping process of wiping foreign substances such as paper dust adhering to the vicinity of the nozzle included in the discharging portion 600 with a wiper member 71. The control circuit 100 may execute the above-mentioned flushing operation as the maintenance process of recovering the discharging state of the ink in the discharging portion 600 to a normal state.

The voltage output circuit 110 generates a voltage VHV having a direct-current voltage of, for example, 42 V, and outputs the voltage VHV to the head unit 2. The voltage VHV is used as a power supply voltage or the like having various configurations included in the head unit 2. Further, the voltage VHV generated by the voltage output circuit 110 may be used as a power supply voltage having various configurations of the control unit 10. Further, the voltage output circuit 110 may generate a plurality of direct-current voltage signals having a voltage value different from that of the voltage VHV and supply the plurality of direct-current voltage signals to each configuration included in the control unit 10 and the head unit 2.

The head unit 2 has a drive circuit 50 and the print head 20. That is, the drive circuit 50 is also mounted on the carriage 24 on which the head unit 2 is mounted.

The drive circuit 50 has drive signal output circuits 51*a* and 51*b*. A digital base drive signal dA and the voltage VHV are input to the drive signal output circuit 51*a*. The drive signal output circuit 51*a* converts the input base drive signal dA into a digital/analog signal and generates a drive signal COMA by performing class D amplification on the converted analog signal to a voltage value corresponding to the voltage VHV. Thereafter, the drive signal output circuit 51*a* outputs the generated drive signal COMA to the print head 20. Similarly, a digital base drive signal dB and the voltage VHV are input to the drive signal output circuit 51*b*. The drive signal output circuit 51*b* converts the input base drive signal dB into a digital/analog signal and generates a drive signal COMB by performing class D amplification on the converted analog signal to a voltage value corresponding to the voltage VHV. Thereafter, the drive signal output circuit 51*b* outputs the generated drive signal COMB to the print head 20.

That is, the base drive signal dA is a signal for defining a waveform of the drive signal COMA, and the base drive signal dB is a signal for defining a waveform of the drive signal COMB. Therefore, the base drive signals dA and dB may be any signals capable of defining waveforms of the drive signals COMA and COMB and may be analog signals, for example. The details of the drive signal output circuits 51*a* and 51*b* will be described later.

Further, the drive circuit 50 generates a constant reference voltage signal VBS at a voltage value of 5.5 V, 6 V, or the like, and supplies the constant reference voltage signal VBS to the print head 20. The reference voltage signal VBS is a signal indicating a potential that serves as a reference for driving a piezoelectric element 60 and may be, for example, a ground potential.

The print head 20 includes a selection control circuit 210, a plurality of selection circuits 230, and a plurality of discharging portions 600 corresponding to each of the plurality of selection circuits 230. The selection control circuit 210 generates a selection signal for selecting or not selecting the waveforms of the drive signals COMA and COMB based on the clock signal SCK, the print data signal SI, the latch signal LAT, and the change signal CH supplied from the control circuit 100, and outputs the selection signal to each of the plurality of selection circuits 230 corresponding to the plurality of discharging portions 600.

The drive signals COMA and COMB and the selection signals output by the selection control circuit 210 are input to each selection circuit 230. Thereafter, the selection circuit 230 generates a drive signal VOUT by selecting or not selecting the waveforms of the drive signals COMA and COMB based on the input selection signal and outputs the drive signal VOUT to the corresponding discharging portion 600.

Each discharging portion 600 includes the piezoelectric element 60. The drive signal VOUT output from the corresponding selection circuit 230 is supplied to one end of the piezoelectric element 60, and the reference voltage signal VBS is supplied to the other end. The piezoelectric element 60 is driven according to a potential difference between the drive signal VOUT supplied to one end and the reference voltage signal VBS supplied to the other end. As a result, the amount of the ink corresponding to the drive of the piezoelectric element 60 is discharged from the discharging portion 600.

As described above, the liquid discharging apparatus 1 in the present embodiment includes the drive signal output circuits 51*a* and 51*b* that output the drive signals COMA and COMB, and the discharging portion 600 that includes the piezoelectric element 60 driven based on the drive signal VOUT that is based on the drive signals COMA and COMB and discharges the ink by driving the piezoelectric element 60, and the head unit 2 including the drive signal output circuits 51*a* and 51*b* and the discharging portion 600 is mounted on the carriage 24.

3. Configuration of Discharging Portion

Figure 3:
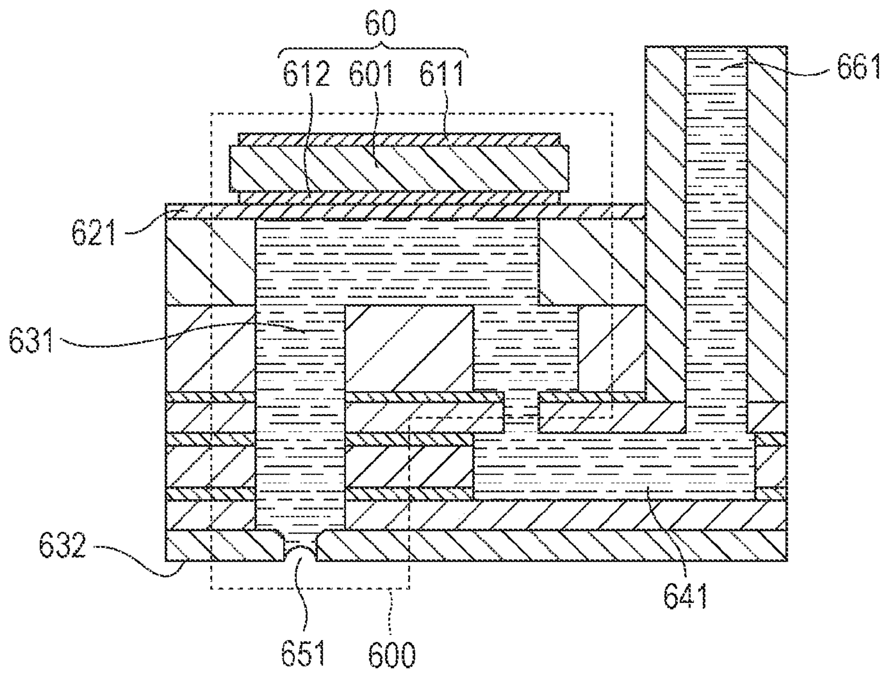
FIG. 3 is a view illustrating a schematic configuration of a discharging portion.

Next, the configuration of the discharging portion 600 will be described. FIG. 3 is a view illustrating a schematic configuration of one discharging portion 600 among the plurality of discharging portions 600 included in the print head 20. As illustrated in FIG. 3, the discharging portion 600 includes the piezoelectric element 60, a vibrating plate 621, a cavity 631, and a nozzle 651.

The cavity 631 is filled with the ink supplied from a reservoir 641. Further, the reservoir 641 is filled with the ink from the ink cartridge 22 via an ink tube (not illustrated) and a supply port 661. That is, the cavity 631 is filled with the ink stored in the corresponding ink cartridge 22.

The vibrating plate 621 displaces by the drive of the piezoelectric element 60 provided on the upper surface of the vibrating plate 621 in FIG. 3. Thereafter, with the displacement of the vibrating plate 621, the internal volume of the cavity 631, which is filled with the ink, is increased and decreased. That is, the vibrating plate 621 functions as a diaphragm that changes the internal volume of the cavity 631.

The nozzle 651 is an opening portion provided on a nozzle plate 632 and communicating with the cavity 631. As the internal volume of the cavity 631 changes, the amount of ink corresponding to the change in the internal volume is discharged from the nozzle 651.

The piezoelectric element 60 has a structure in which a piezoelectric body 601 is interposed between a pair of electrodes 611 and 612. The piezoelectric body 601 having such a structure is driven such that a center part bends in the vertical direction according to a potential difference between the voltage supplied to the electrode 611 and the voltage supplied to the electrode 612.

Specifically, the drive signal VOUT is supplied to the electrode 611 of the piezoelectric element 60. Further, the reference voltage signal VBS is supplied to the electrode 612 of the piezoelectric element 60. Thereafter, the piezoelectric element 60 is driven so as to bend in the upward direction when a potential difference between the drive signal VOUT and the reference voltage signal VBS becomes small, and to bend in the downward direction when the potential difference between the drive signal VOUT and the reference voltage signal VBS becomes large.

In the discharging portion 600 configured as described above, by driving the piezoelectric element 60 to bend in the upward direction, the vibrating plate 621 displaces and the internal volume of the cavity 631 is increased. As a result, the ink is pulled from the reservoir 641 into the cavity 631. On the other hand, by driving the piezoelectric element 60 to bend in the downward direction, the vibrating plate 621 displaces and the internal volume of the cavity 631 is decreased. As a result, the amount of ink corresponding to the degree of the decrease is discharged from the nozzle 651. That is, the discharging portion 600 included in the print head 20 discharges the ink by driving the piezoelectric element 60 that is driven based on the drive signal VOUT.

The piezoelectric element 60 is not limited to the structure illustrated in FIG. 3 and may be any structure as long as the ink can be discharged from the discharging portion 600. That is, the piezoelectric element 60 is not limited to the above-mentioned bending vibration configuration and may have a longitudinal vibration configuration.

4. Configuration and Operation of Print Head

Next, the configuration and operation of the print head 20 will be described. As described above, by selecting or not selecting the drive signals COMA and COMB output from the drive circuit 50 based on the clock signal SCK, the print data signal SI, the latch signal LAT, and the change signal CH, the print head 20 generates the drive signal VOUT and supplies the drive signal VOUT to the corresponding discharging portion 600. In describing the configuration and operation of the print head 20, first, an example of the waveforms of the drive signals COMA and COMB input from the drive circuit 50 and an example of the waveform of the drive signal VOUT output to the discharging portion 600 will be described.

Figure 4:
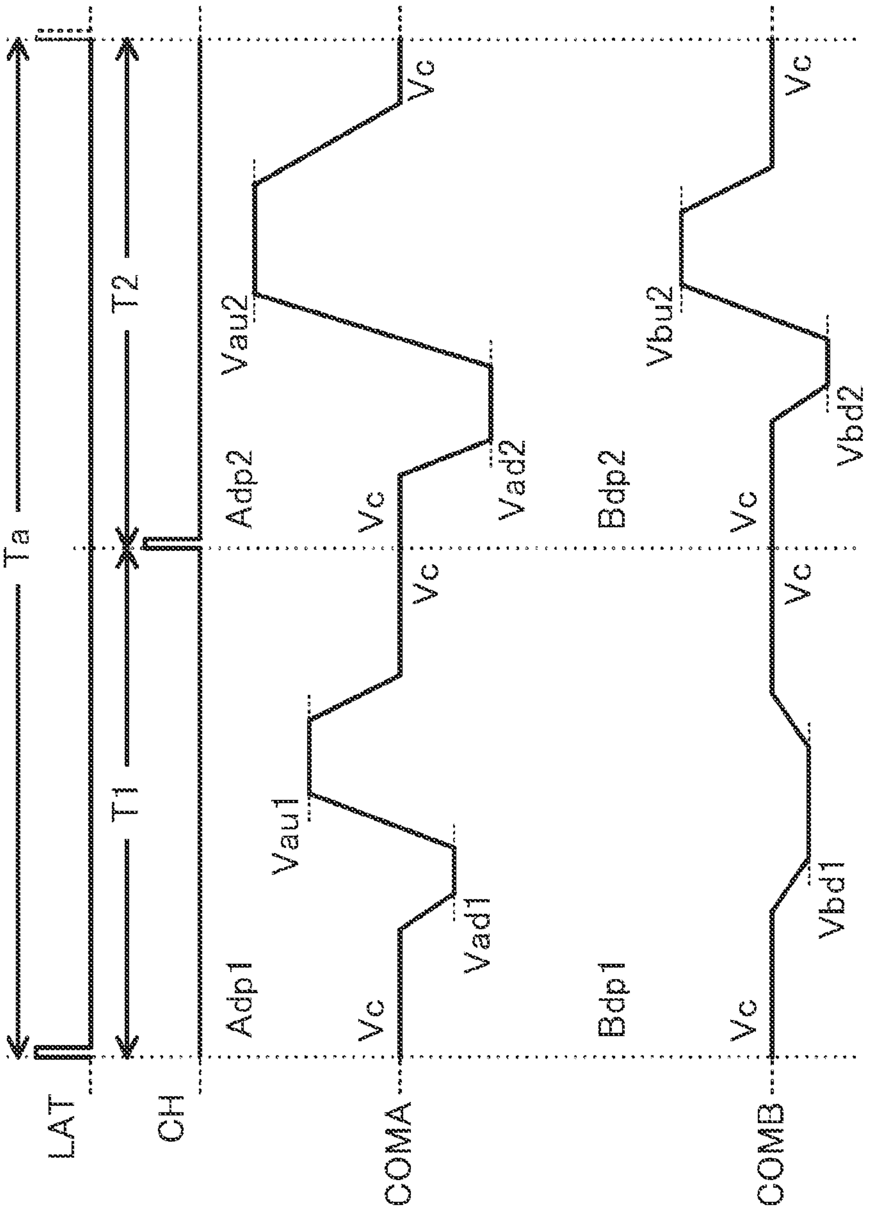
FIG. 4 is a view illustrating an example of waveforms of drive signals COMA and COMB.

FIG. 4 is a view illustrating an example of the waveforms of the drive signals COMA and COMB. As illustrated in FIG. 4, the drive signal COMA is a signal of a waveform in which a trapezoidal waveform Adp1 disposed in a period T1 from the rise of the latch signal LAT to the rise of the change signal CH and a trapezoidal waveform Adp2 disposed in a period T2 from the rise of the change signal CH to the rise of the latch signal LAT are made continuous.

In the trapezoidal waveform Adp1, the voltage value changes in the order of a potential Vc, a potential Vad1, a potential Vau1, and a potential Vc. Specifically, in the period T1, the voltage value of the trapezoidal waveform Adp1 is started from the potential Vc and becomes the potential Vad1, which is a lower potential than the potential Vc, and then becomes the potential Vau1, which is a higher potential than the potential Vc, after the potential Vad1. Thereafter, the voltage value of the trapezoidal waveform Adp1 becomes the potential Vc. When such a trapezoidal waveform Adp1 is supplied to the discharging portion 600, the piezoelectric element 60 is driven so as to bend in the upward direction in the period when the voltage value becomes the potential Vad1. As a result, the ink is supplied to the inside of the cavity 631. Thereafter, in the period when the voltage value becomes the potential Vau1, the piezoelectric element 60 is driven so as to bend in the downward direction. As a result, the ink filling inside the cavity 631 is discharged from the nozzle 651.

In the trapezoidal waveform Adp2, the voltage value changes in the order of the potential Vc, a potential Vad2, a potential Vau2, and the potential Vc. Specifically, in the period T1, the voltage value of the trapezoidal waveform Adp2 is started from the potential Vc and becomes the potential Vad2, which is a lower potential than the potential Vc, and then becomes the potential Vau2, which is a higher potential than the potential Vc, after the potential Vad2. Thereafter, the voltage value of the trapezoidal waveform Adp2 becomes the potential Vc. When such a trapezoidal waveform Adp2 is supplied to the discharging portion 600, the piezoelectric element 60 is driven so as to bend in the upward direction in the period when the voltage value becomes the potential Vad2. As a result, the ink is supplied to the inside of the cavity 631. Thereafter, in the period when the voltage value becomes the potential Vau2, the piezoelectric element 60 is driven so as to bend in the downward direction. As a result, the ink filling inside the cavity 631 is discharged from the nozzle 651.

In the drive signal COMA as described above, as illustrated in FIG. 4, the potential Vau1 included in the trapezoidal waveform Adp1 is a lower potential than the potential Vau2 included in the trapezoidal waveform Adp2, and the potential Vad1 included in the trapezoidal waveform Adp1 is a higher potential than the potential Vad2 included in the trapezoidal waveform Adp2. That is, the potential Vau2 included in the trapezoidal waveform Adp2 is the maximum voltage value in the drive signal COMA, and in the present embodiment, the potential Vau2 included in the trapezoidal waveform Adp2 is 25 V or higher. Therefore, the amount of ink discharged from the nozzle 651 when the trapezoidal waveform Adp1 is supplied to the discharging portion 600 is smaller than the amount of ink discharged from the nozzle 651 when the trapezoidal waveform Adp2 is supplied to the discharging portion 600. Therefore, in the following description, the amount of ink discharged from the corresponding nozzle 651 when the trapezoidal waveform Adp1 is supplied to the discharging portion 600 is referred to as a small amount, and the amount of ink discharged from the corresponding nozzle 651 when the trapezoidal waveform Adp2 is supplied to the discharging portion 600 is referred to as a medium amount that is larger than the small amount described above.

Further, as illustrated in FIG. 4, the drive signal COMB includes a waveform in which a trapezoidal waveform Bdp1 disposed in the period T1 and a trapezoidal waveform Bdp2 disposed in the period T2 are made continuous.

In the trapezoidal waveform Bdp1, the voltage value changes in the order of the potential Vc, a potential Vbd1, and a potential Vc. Specifically, in the period T1, the voltage value of the trapezoidal waveform Bdp1 is started from the potential Vc and becomes the potential Vbd1, which is a lower potential than the potential Vc, and then becomes the potential Vc after the potential Vbd1. When such a trapezoidal waveform Bdp1 is supplied to the discharging portion 600, the piezoelectric element 60 is driven to such an extent that the ink is not discharged from the nozzle 651 in the period when the voltage value becomes the potential Vad1. In the following description, driving the piezoelectric element 60 to such an extent that the ink is not discharged from the nozzle 651 may be referred to as "micro-vibration".

The trapezoidal waveform Bdp2 is a waveform in which the voltage value changes in the order of the potential Vc, a potential Vbd2, a potential Vbu2, and the potential Vc. Specifically, in the period T2, the voltage value of the trapezoidal waveform Bdp2 is started from the potential Vc and becomes the potential Vbd2, which is a lower potential than the potential Vc, and then becomes the potential Vbu2, which is a higher potential than the potential Vc, after the potential Vbd2. Thereafter, the voltage value of the trapezoidal waveform Bdp2 becomes the potential Vc. When such a trapezoidal waveform Bdp2 is supplied to the discharging portion 600, the piezoelectric element 60 is driven so as to bend in the upward direction in the period when the voltage value becomes the potential Vbd2. As a result, the ink is supplied to the inside of the cavity 631. Thereafter, in the period when the voltage value becomes the potential Vbu2, the piezoelectric element 60 is driven so as to bend in the downward direction. As a result, the ink filling inside the cavity 631 is discharged from the nozzle 651.

In the drive signal COMB as described above, the potential Vbu2 included in the trapezoidal waveform Bdp2 is a potential equivalent to the potential Vau1 included in the trapezoidal waveform Adp1, and the potential Vbd2 included in the trapezoidal waveform Bdp2 is a potential equivalent to the potential Vad1 included in the trapezoidal waveform Adp1. Therefore, when the trapezoidal waveform Bdp2 is supplied to the discharging portion 600, the small amount of ink is discharged from the corresponding nozzle 651 as in the case where the trapezoidal waveform Adp1 is supplied to the discharging portion 600.

In FIG. 4, the trapezoidal waveform Adp1 and the trapezoidal waveform Bdp2 are shown as having similar waveforms, but the trapezoidal waveform Adp1 and the trapezoidal waveform Bdp2 may have different waveforms. Further, the description is made that the small amount of ink is discharged from the corresponding nozzles 651 in both the case where the trapezoidal waveform Adp1 is supplied to the discharging portion 600 and the case where the trapezoidal waveform Bdp2 is supplied to the discharging portion 600, but different amount of ink may be discharged in the case where the trapezoidal waveform Adp1 is supplied to the discharging portion 600 and the case where the trapezoidal waveform Bdp2 is supplied to the discharging portion 600. That is, the waveforms of the drive signals COMA and COMB are not limited to the waveforms illustrated in FIG. 4, and various waveforms may be combined according to the movement speed of the carriage 24 to which the print head 20 is attached, the properties of the ink discharged from the nozzle 651, the material of the medium P, and the like.

Figure 5:
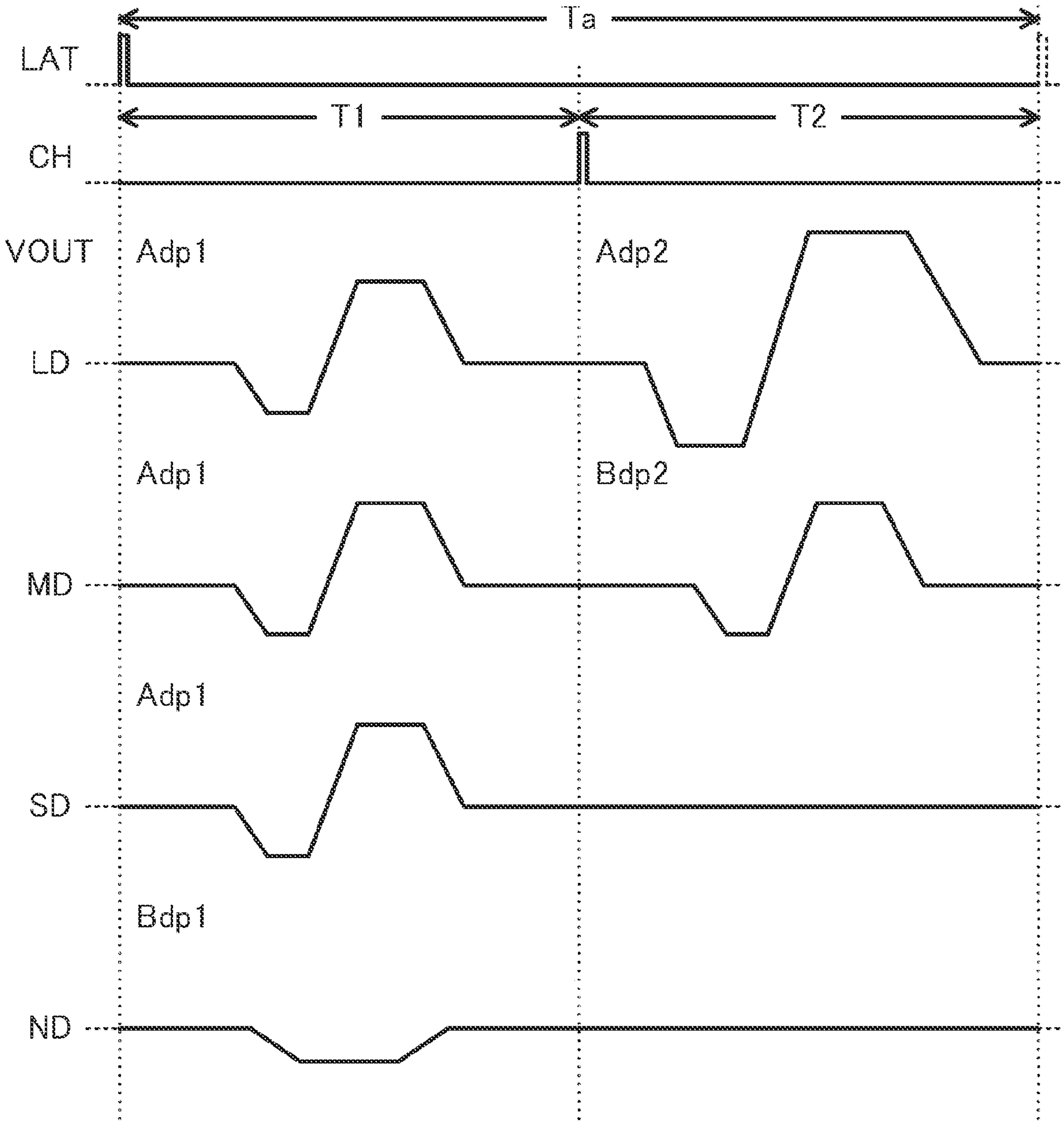
FIG. 5 is a view illustrating an example of a waveform of a drive signal VOUT.

FIG. 5 is a view illustrating an example of the waveform of the drive signal VOUT. FIG. 5 illustrates waveforms of the drive signal VOUT in comparison with when the size of the dots formed on the medium P is a "large dot LD", a "medium dot MD", a "small dot SD", and "non-recording ND", respectively.

As illustrated in FIG. 5, the drive signal VOUT when the large dot LD is formed on the medium P has a waveform in which the trapezoidal waveform Adp1 disposed in the period T1 and the trapezoidal waveform Adp2 disposed in the period T2 are made continuous in a cycle Ta. When this drive signal VOUT is supplied to the discharging portion 600, the small amount of ink and the medium amount of ink are discharged from the corresponding nozzle 651 in the cycle Ta. As a result, the large dot LD is formed on the medium P by landing and coalescing each of the ink.

The drive signal VOUT when the medium dot MD is formed on the medium P has a waveform in which the trapezoidal waveform Adp1 disposed in the period T1 and the trapezoidal waveform Bdp2 disposed in the period T2 are made continuous in a cycle Ta. When this drive signal VOUT is supplied to the discharging portion 600, the small amount of ink is discharged twice from the corresponding nozzle 651 in the cycle Ta. As a result, the medium dot MD is formed on the medium P by landing and coalescing each of the ink.

The drive signal VOUT when the small dot SD is formed on the medium P has a waveform in which the trapezoidal waveform Adp1 disposed in the period T1 and a waveform where the voltage value disposed in the period T2 is constant at the potential Vc are made continuous in the cycle Ta. When this drive signal VOUT is supplied to the discharging portion 600, the small amount of ink is discharged from the corresponding nozzle 651 in the cycle Ta. Therefore, the ink is landed on the medium P to form the small dot SD.

The drive signal VOUT corresponding to the non-recording ND that does not form dots on the medium P has a waveform in which the trapezoidal waveform Bdp1 disposed in the period T1 and a waveform where the voltage value disposed in the period T2 is constant at the potential Vc are made continuous in the cycle Ta. When this drive signal VOUT is supplied to the discharging portion 600, the ink is not discharged but the ink in the vicinity of the opening portion of the corresponding nozzle 651 only slightly vibrates in the cycle Ta. Therefore, the ink is not landed on the medium P and dots are not formed.

The waveform, in which the voltage value supplied to the discharging portion 600 is constant at the potential Vc, is a waveform generated by holding the voltage signal of potential Vc supplied to the discharging portion 600 immediately before by the piezoelectric element 60 that is a capacitive load when none of the trapezoidal waveforms Adp1, Adp2, Bdp1, and Bdp2 is selected as the drive signal VOUT. That is, when none of the trapezoidal waveforms Adp1, Adp2, Bdp1, and Bdp2 is selected as the drive signal VOUT, the drive signal VOUT in which the voltage value is constant at the potential Vc is supplied to the discharging portion 600.

Figure 6:
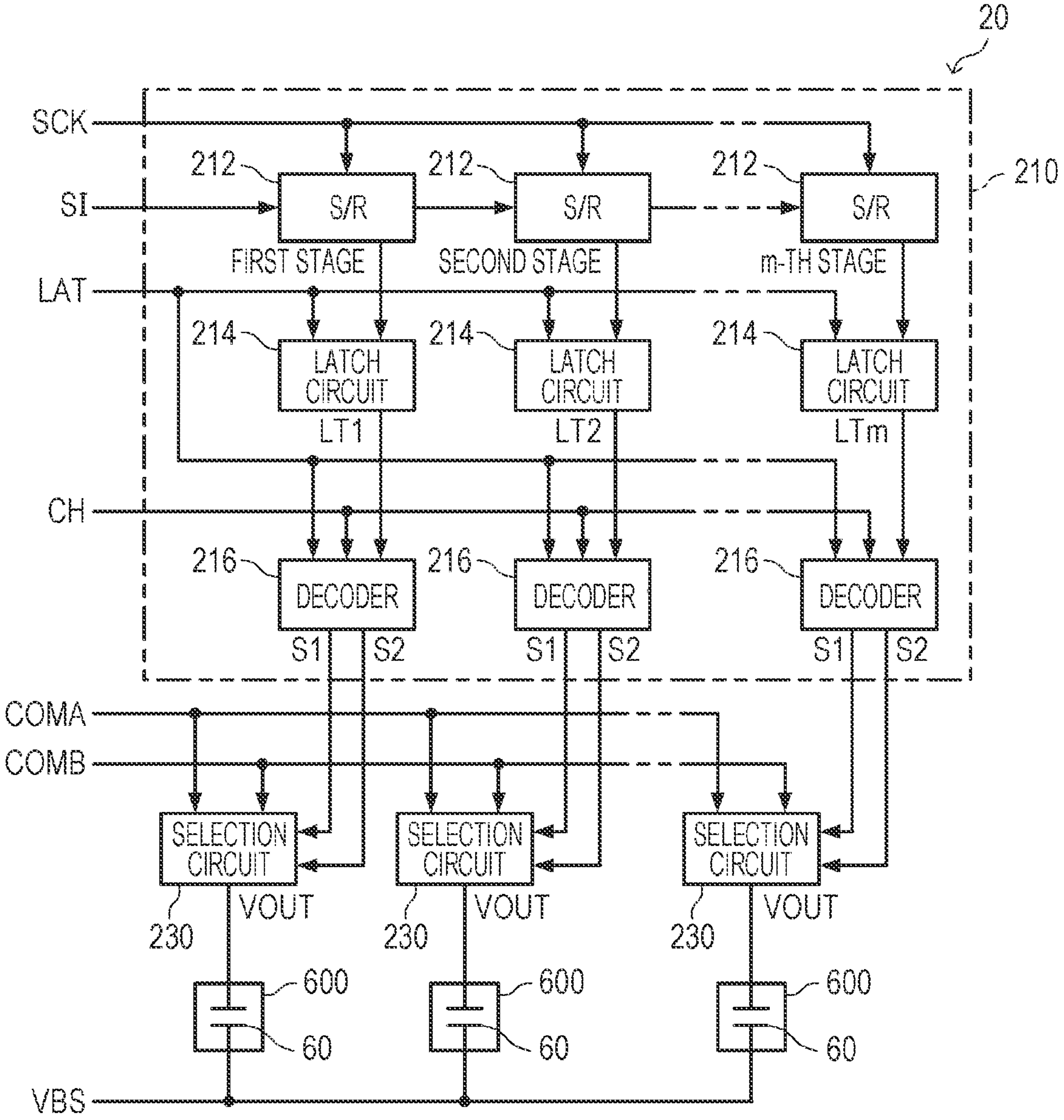
FIG. 6 is a view illustrating a configuration of a selection control circuit and a selection circuit.

The drive signal VOUT as described above is generated by selecting or not selecting the waveforms of the drive signals COMA and COMB by the operation of the selection control circuit 210 and the selection circuit 230. FIG. 6 is a view illustrating a configuration of the selection control circuit 210 and the selection circuit 230. As illustrated in FIG. 6, the print data signal SI, the latch signal LAT, the change signal CH, and the clock signal SCK are input to the selection control circuit 210. In the selection control circuit 210, a set of a shift register (S/R) 212, a latch circuit 214, and a decoder 216 is provided corresponding to each of m discharging portions 600. That is, the selection control circuit 210 includes the same number of sets of the shift registers 212, the latch circuits 214, and the decoders 216 as the m discharging portions 600.

The print data signal SI is a signal synchronized with the clock signal SCK and is a signal having a total of 2 m bits including 2-bit print data [SIH,SIL] for selecting any of the large dot LD, medium dot MD, small dot SD, and non-recording ND for each of the m discharging portions 600. The input print data signal SI is stored in the shift register 212 for each 2-bit print data [SIH,SIL] included in the print data signal SI corresponding to the m discharging portions 600. Specifically, in the selection control circuit 210, the m-th stage of shift registers 212 corresponding to the m discharging portions 600 are coupled to each other in a cascade manner, and a serially input print data signal SI is sequentially transferred to the subsequent stage according to the clock signal SCK. In FIG. 6, in order to distinguish the m shift registers 212, first, second, . . . , and m-th stages are indicated in order from the upstream to which the print data signal SI is input.

Each of the m latch circuits 214 latches the 2-bit print data [SIH,SIL] stored in each of the m shift registers 212 at the rise of the latch signal LAT.

Figures 7, 8:
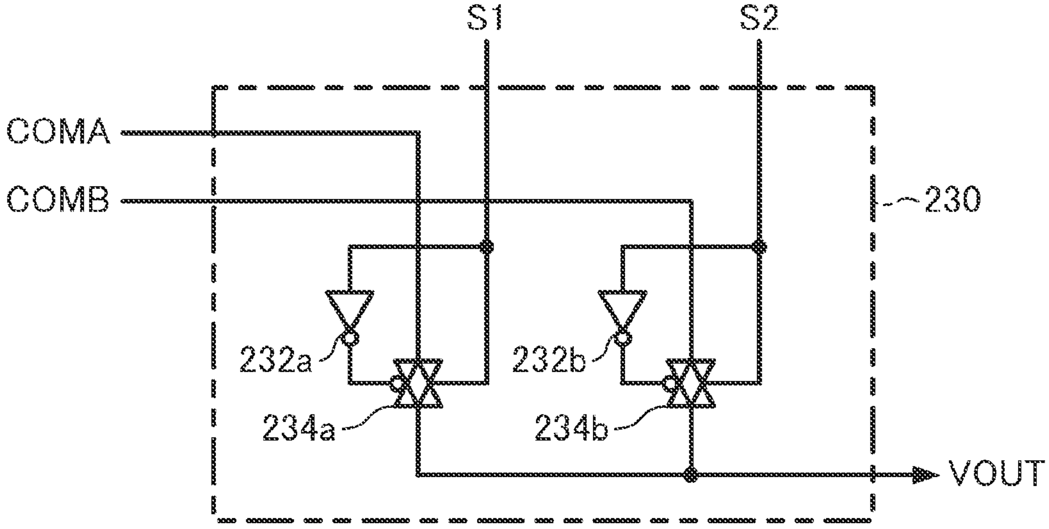
FIG. 7 is a view illustrating decoding contents in a decoder.
FIG. 8 is a view illustrating a configuration of the selection circuit.

FIG. 7 is a view illustrating decoding contents in a decoder 216. The decoder 216 outputs selection signals S1 and S2 according to the 2-bit print data [SIH,SIL] latched by the latch circuit 214. For example, when the 2-bit print data [SIH,SIL] is [1,0], the decoder 216 outputs logic levels of the selection signals S1 as H and L levels in the periods T1 and T2 and outputs logic levels of the selection signals S2 as L and H levels in the periods T1 and T2 to the selection circuit 230.

The selection circuit 230 is provided corresponding to each of the discharging portions 600. That is, the number of selection circuits 230 included in the print head 20 is m, which is the same as the total number of discharging portions 600. FIG. 8 is a view illustrating a configuration of the selection circuit 230 corresponding to one discharging portion 600. As illustrated in FIG. 8, the selection circuit 230 includes inverters 232*a* and 232*b*, which are NOT circuits, and transfer gates 234*a* and 234*b*.

The selection signal S1 is input to a positive control end of a transfer gate 234*a* that is not marked with a circle, is logically inverted by the inverter 232*a*, and is also input to a negative control end of the transfer gate 234*a* marked with the circle. Further, the drive signal COMA is supplied to an input end of the transfer gate 234*a*. The transfer gate 234*a* makes the input end and the output end conductive when the selection signal S1 is at the H level and makes the input end and the output end non-conductive when the selection signal S1 is at the L level. The selection signal S2 is input to a positive control end of a transfer gate 234*b* that is not marked with a circle, is logically inverted by the inverter 232*b*, and is also input to a negative control end of the transfer gate 234*b* marked with the circle. Further, the drive signal COMB is supplied to an input end of the transfer gate 234*b*. The transfer gate 234*b* makes the input end and the output end conductive when the selection signal S2 is at the H level and makes the input end and the output end non-conductive when the selection signal S2 is at the L level. The output ends of the transfer gates 234*a* and 234*b* are commonly coupled to each other. Signals output to the output ends of the transfer gates 234*a* and 234*b* correspond to the drive signals VOUT.

As described above, the selection circuit 230 selects the waveforms of the drive signals COMA and COMB by controlling the transfer gates 234*a* and 234*b* based on the input selection signals S1 and S2 and outputs the selected waveforms as the drive signals VOUT.

Figure 9:
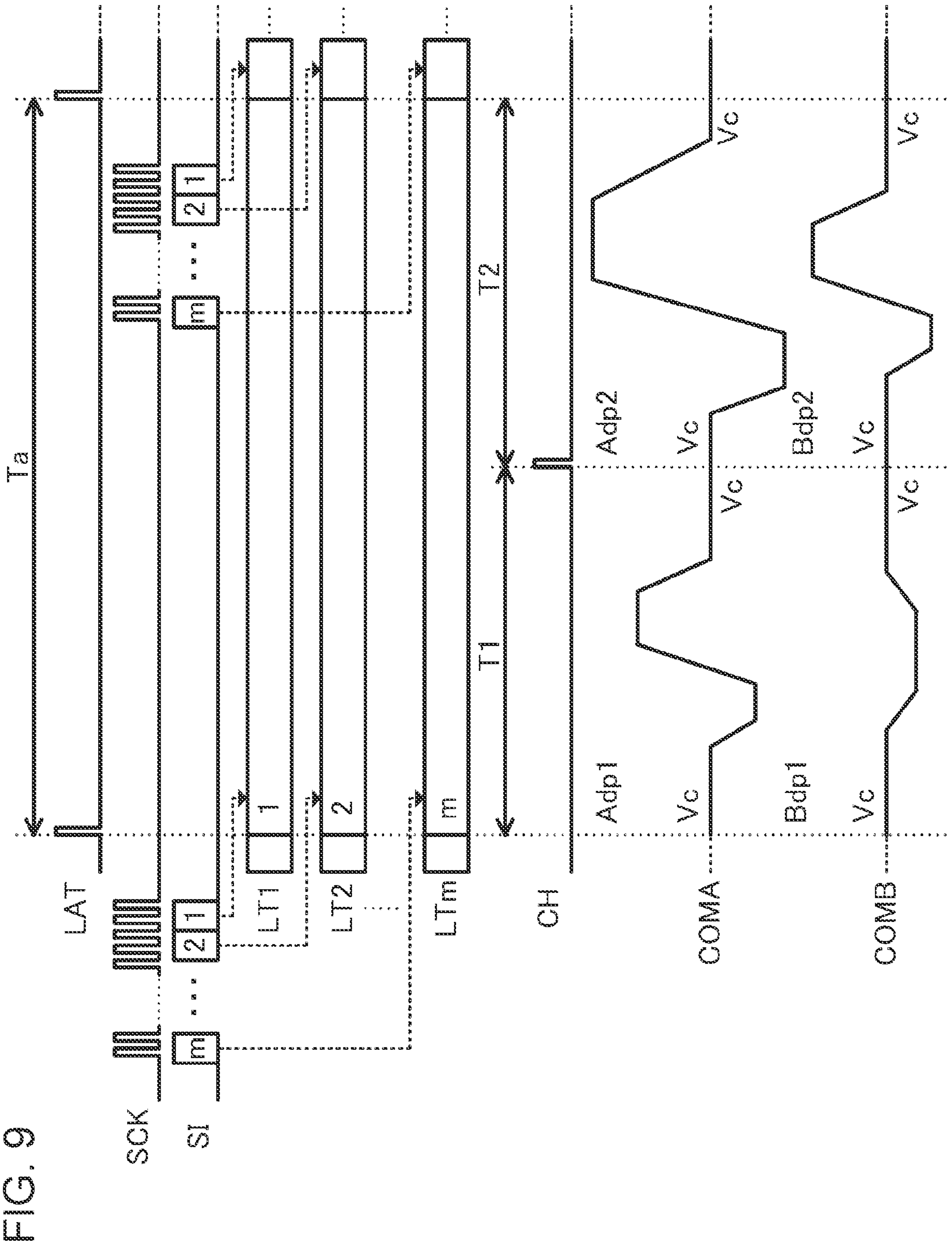
FIG. 9 is a view for describing an operation of the selection control circuit and the selection circuit.

The operation of the selection control circuit 210 and the selection circuit 230 will be described with reference to FIG. 9. FIG. 9 is a view for describing the operation of the selection control circuit 210 and the selection circuit 230. The print data signal SI input to the selection control circuit 210 is sequentially transferred in the shift register 212 corresponding to the discharging portion 600 in synchronization with the clock signal SCK. When the input of the clock signal SCK is stopped, the 2-bit print data [SIH,SIL] corresponding to each of the discharging portions 600 is stored in each shift register 212. In the present embodiment, the print data signal SI is input in the order corresponding to the m-th, . . . , second, and first stages of the discharging portion 600 in the shift register 212.

When the latch signal LAT rises, each of the latch circuits 214 latches the 2-bit print data [SIH,SIL] stored in the shift register 212 all at once. LT1, LT2, . . . , and LTm illustrated in FIG. 9 indicate the 2-bit print data [SIH,SIL] latched by the latch circuits 214 corresponding to the first, second, . . . , m-th stages of the shift register 212.

The decoder 216 outputs the logic levels of the selection signals S1 and S2 as illustrated in FIG. 7 in each of the periods T1 and T2 depending on the dot size defined in the latched 2-bit print data [SIH,SIL].

Specifically, when the print data [SIH,SIL] is [1,1], the decoder 216 defines the selection signals S1 as H and H levels in the periods T1 and T2 and defines the selection signals S2 as L and L levels in the periods T1 and T2. In this case, the selection circuit 230 selects the trapezoidal waveform Adp1 in the period T1 and selects the trapezoidal waveform Adp2 in the period T2. As a result, the selection circuit 230 outputs the drive signal VOUT corresponding to the large dot LD illustrated in FIG. 5.

Further, when the print data [SIH,SIL] is [1,0], the decoder 216 defines the selection signals S1 as H and L levels in the periods T1 and T2 and defines the selection signals S2 as L and H levels in the periods T1 and T2. In this case, the selection circuit 230 selects the trapezoidal waveform Adp1 in the period T1 and selects the trapezoidal waveform Bdp2 in the period T2. As a result, the selection circuit 230 outputs the drive signal VOUT corresponding to the medium dot MD illustrated in FIG. 5.

Further, when the print data [SIH,SIL] is [0,1], the decoder 216 defines the selection signals S1 as H and L levels in the periods T1 and T2 and defines the selection signals S2 as L and L levels in the periods T1 and T2. In this case, the selection circuit 230 selects the trapezoidal waveform Adp1 in the period T1 and does not select either the trapezoidal waveforms Adp2 or Bdp2 in the period T2. As a result, the selection circuit 230 outputs the drive signal VOUT corresponding to the small dot SD illustrated in FIG. 5.

Further, when the print data [SIH,SIL] is [0,0], the decoder 216 defines the selection signals S1 as L and L levels in the periods T1 and T2 and defines the selection signals S2 as H and L levels in the periods T1 and T2. In this case, the selection circuit 230 selects the trapezoidal waveform Bdp1 in the period T1 and does not select either the trapezoidal waveforms Adp2 or Bdp2 in the period T2. As a result, the selection circuit 230 outputs the drive signal VOUT corresponding to the non-recording ND illustrated in FIG. 5.

As described above, the selection control circuit 210 and the selection circuit 230 select the waveforms of the drive signals COMA and COMB based on the print data signal SI, the latch signal LAT, the change signal CH, and the clock signal SCK and output the selected waveforms to the discharging portion 600 as the drive signals VOUT.

Examples of the drive signals include the drive signals COMA and COMB output by the drive signal output circuits 51*a* and 51*b* and the drive signal VOUT generated by selecting or not selecting the trapezoidal waveforms Adp1, Adp2, Bdp1, and Bdp2 included in the drive signals COMA and COMB. In the drive signal VOUT, the potential Vau2 included in the trapezoidal waveform Adp2 of the drive signal COMA, which is the highest potential, is an example of a first potential, and the potential Vad2 included in the trapezoidal waveform Adp2 of the drive signal COMA, which is the lowest potential, is an example of a second potential. That is, the drive signal VOUT supplied to the discharging portion 600 displaces between the potential Vau2 and the potential Vad2.

5. Configuration of Drive Signal Output Circuit

Figure 10:
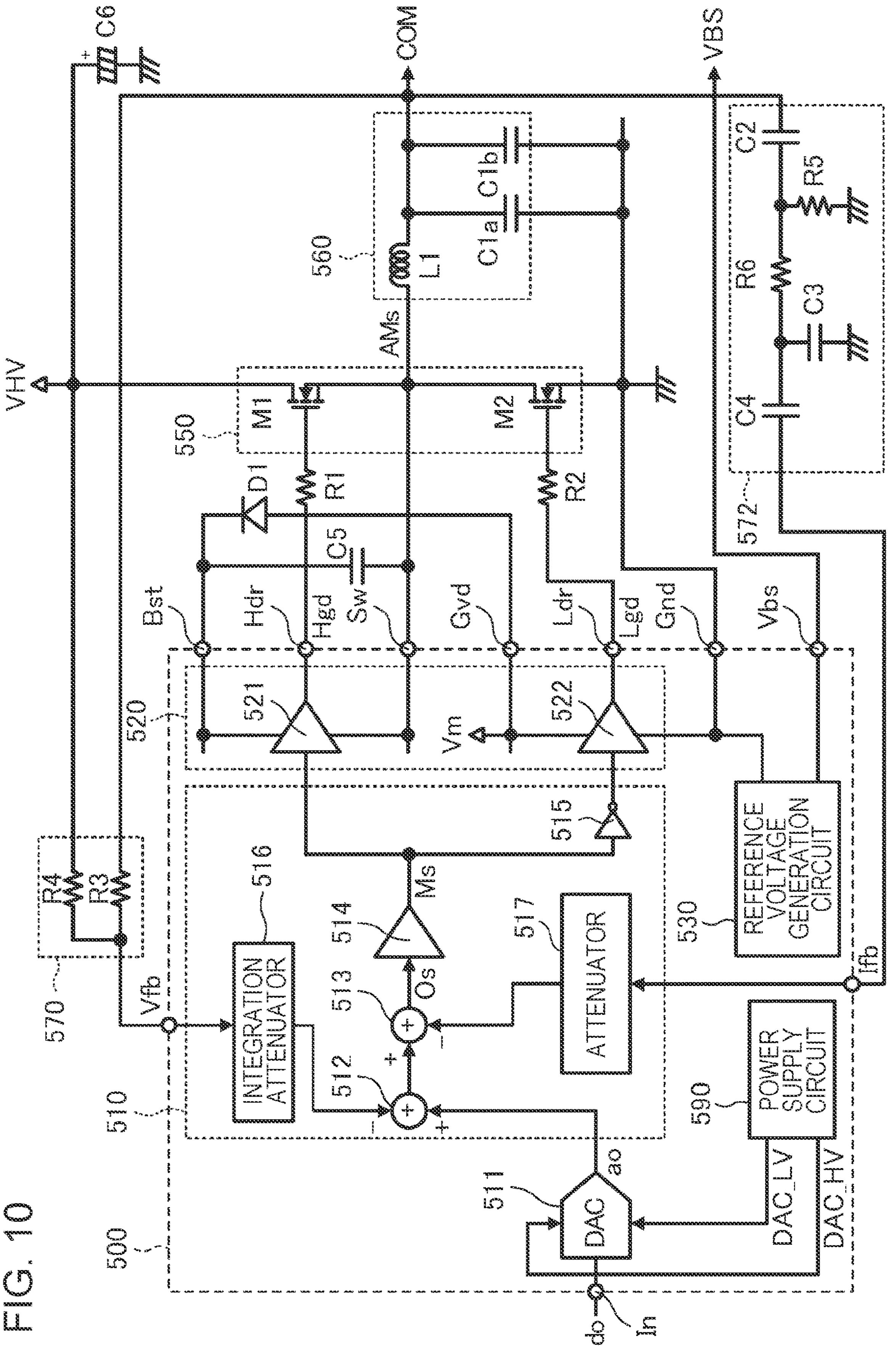
FIG. 10 is a view illustrating an electrical configuration of a drive signal output circuit.

Next, the configuration and operation of the drive signal output circuits 51*a* and 51*b* that output the drive signals COMA and COMB will be described. FIG. 10 is a view illustrating an electrical configuration of the drive signal output circuits 51*a* and 51*b*. The drive signal output circuit 51*a* and the drive signal output circuit 51*b* have the same configuration, but the input signals and the output signals thereof are different from each other. Therefore, in the following description, the drive signal output circuits 51*a* and 51*b* will be simply referred to as the drive signal output circuit 51 without distinction, and the configuration and operation thereof will be described. Further, in this case, a signal output by the drive signal output circuit 51 is simply referred to as a drive signal COM, and a signal that is the base of the drive signal COM is referred to as a base drive signal do.

As illustrated in FIG. 10, the drive signal output circuit 51 includes an integrated circuit 500 including a modulation circuit 510, an amplification circuit 550, a demodulation circuit 560, and feedback circuits 570 and 572. That is, the drive signal output circuit 51 has the modulation circuit 510 that outputs a modulation signal Ms obtained by modulating the base drive signal do that is the base of the drive signal COM, the amplification circuit 550 that outputs an amplified modulation signal AMs obtained by amplifying the modulation signal Ms, and the demodulation circuit 560 that includes capacitors C1*a* and C1*b* and an inductor L1 and outputs the drive signal COM obtained by demodulating the amplified modulation signal AMs.

The integrated circuit 500 has a plurality of terminals including a terminal In, a terminal Bst, a terminal Hdr, a terminal Sw, a terminal Gvd, a terminal Ldr, a terminal Gnd, and a terminal Vbs. The integrated circuit 500 is electrically coupled to the substrate provided externally (not illustrated) via the plurality of terminals. As illustrated in FIG. 10, the integrated circuit 500 includes a digital to analog converter (DAC) 511, the modulation circuit 510, a gate drive circuit 520, a reference voltage generation circuit 530, and a power supply circuit 590.

The power supply circuit 590 generates a first voltage signal DAC_HV and a second voltage signal DAC LV and supplies the generated signals to a DAC 511. The DAC 511 converts the digital base drive signal do for defining the waveform of the input drive signal COM into a base drive signal ao that is an analog signal of the voltage value between the first voltage signal DAC_HV and the second voltage signal DAC LV and output the converted signal to the modulation circuit 510. The maximum value of the voltage amplitude of the base drive signal ao is defined as the first voltage signal DAC_HV, and the minimum value is defined as the second voltage signal DAC LV. That is, the first voltage signal DAC_HV is the reference voltage on the high voltage side in the DAC 511, and the second voltage signal DAC LV is the reference voltage on the low voltage side in the DAC 511. The signal obtained by amplifying the analog base drive signal ao becomes the drive signal COM. That is, the base drive signal ao corresponds to a target signal before amplification of the drive signal COM. In other words, the base drive signal ao and the base drive signal do of the digital signal that is the base of the base drive signal ao are the signals that are the base of the drive signal COM.

The modulation circuit 510 generates the modulation signal Ms obtained by modulating the base drive signal ao and outputs the modulation signal Ms to the gate drive circuit 520. The modulation circuit 510 includes adders 512 and 513, a comparator 514, an inverter 515, an integration attenuator 516, and an attenuator 517.

The integration attenuator 516 attenuates and integrates the drive signal COM input via a terminal Vfb and supplies the drive signal COM to the − side input end of the adder 512. Further, the base drive signal ao is input to the + side input end of the adder 512. The adder 512 supplies a voltage, which is obtained by subtracting and integrating the voltage input to the − side input end from the voltage input to the + side input end, to the + side input end of the adder 513. The maximum value of the voltage amplitude of the base drive signal ao is substantially 2 V as described above, whereas the maximum value of the voltage of the drive signal COM is 25 V or larger and may exceed 40 V. Therefore, the integration attenuator 516 attenuates the voltage of the drive signal COM, which is input via the terminal Vfb, in order to match the amplitude ranges of both voltages in obtaining the deviation.

The attenuator 517 supplies a voltage obtained by attenuating the high frequency component of the drive signal COM input via the terminal Ifb to the − side input end of the adder 513. Further, the voltage output from the adder 512 is input to the + side input end of the adder 513. The adder 513 outputs a voltage signal Os, which is obtained by subtracting the voltage input to the − side input end from the voltage input to the + side input end, to the comparator 514.

The voltage signal Os output from the adder 513 is a voltage obtained by subtracting the voltage of the signal supplied to the terminal Vfb from the voltage of the base drive signal ao and further subtracting the voltage of the signal supplied to the terminal Ifb. Therefore, the voltage of the voltage signal Os output from the adder 513 becomes a signal obtained by correcting the deviation, which is obtained by subtracting the attenuation voltage of the drive signal COM from the voltage of the target base drive signal ao, with the high frequency component of the drive signal COM.

The comparator 514 outputs the modulation signal Ms obtained by pulse-modulating the voltage signal Os output from the adder 513. Specifically, the comparator 514 outputs the modulation signal Ms that becomes the H level at the time when the voltage value of the voltage signal Os output from the adder 513 rises and is equal to or larger than a predetermined threshold value Vth1, and becomes the L level at the time when the voltage value of the voltage signal Os falls and is below a predetermined threshold value Vth2. The threshold values Vth1 and Vth2 are set in the relationship of threshold value Vth1>threshold value Vth2. The frequency or duty ratio of the modulation signal Ms change in response to the base drive signals do and ao. Therefore, by the attenuator 517 to adjust the modulation gain corresponding to the sensitivity, the amount of change in the frequency and duty ratio of the modulation signal Ms can be adjusted.

The modulation signal Ms that is output from the comparator 514 is supplied to the gate driver 521 included in the gate drive circuit 520. Further, the modulation signal Ms is also supplied to the gate driver 522 included in the gate drive circuit 520 after the logic level is inverted by the inverter 515. That is, the logic levels of the signals supplied to the gate driver 521 and the gate driver 522 are in an exclusive relationship with each other.

A timing may be controlled such that the logic levels of the signals supplied to the gate driver 521 and the gate driver 522 do not become the H level at the same time. That is, strictly speaking, having an exclusive relationship with each other means that the logic levels of the signals supplied to the gate driver 521 and the gate driver 522 do not become the H level at the same time, and in detail, it means that the transistor M1 and the transistor M2 included in the amplification circuit 550 described later are not turned on at the same time.

The gate drive circuit 520 includes the gate driver 521 and the gate driver 522. The gate driver 521 performs level-shifting on the modulation signal Ms output from the comparator 514 and outputs the modulation signal Ms as an amplified control signal Hgd from the terminal Hdr. The higher side of the power supply voltage of the gate driver 521 is the voltage supplied via the terminal Bst, and the lower side is the voltage supplied via the terminal Sw. The terminal Bst is coupled to one end of the capacitor C5 and the cathode of the diode D1 for preventing backflow. The terminal Sw is coupled to the other end of the capacitor C5. The anode of the diode D1 is coupled to the terminal Gvd. As a result, the anode of the diode D1 is supplied with a voltage Vm, which is a direct-current voltage of, for example, 7.5 V supplied from a power supply circuit (not illustrated). Therefore, a potential difference between the terminal Bst and the terminal Sw is substantially equal to a potential difference at both ends of the capacitor C5, that is, the voltage Vm. The gate driver 521 outputs the amplified control signal Hgd having a voltage larger than the terminal Sw by the voltage Vm from the terminal Hdr in response to the input modulation signal Ms.

The gate driver 522 operates on the lower potential side than the gate driver 521. The gate driver 522 performs the level-shifting on the signal in which the logic level of the modulation signal Ms output from the comparator 514 is inverted by the inverter 515, and outputs the signal as an amplified control signal Lgd from the terminal Ldr. The voltage Vm is applied to the higher side of the power supply voltage of the gate driver 522, and a ground potential of, for example, 0 V is supplied to the lower side via the terminal Gnd. The amplified control signal Lgd that has a voltage larger than the terminal Gnd following the signal input to the gate driver 522 by the voltage Vm is output from the terminal Ldr.

The signal obtained by modulating the base drive signal do and the base drive signal ao means, in a narrow sense, the modulation signal Ms output by the comparator 514, but when considering that it is a pulse-modulated signal of an analog base drive signal ao based on the digital base drive signal do, the signal in which the logic level of the modulation signal Ms is inverted is also a signal obtained by modulating the base drive signal do and the base drive signal ao. That is, the signal obtained by modulating the base drive signal do and the base drive signal ao includes not only the modulation signal Ms output by the comparator 514 but also a signal in which the logic level of the modulation signal Ms output by the comparator 514 is inverted, or a signal in which timing is controlled with respect to the modulation signal Ms. Further, the amplified control signal Hgd output by the gate driver 521 is a signal obtained by performing level-shifting on the input modulation signal Ms, and the amplified control signal Lgd output by the gate driver 522 is a signal obtained by performing level-shifting on the signal in which the logic level of the modulation signal Ms is inverted. Accordingly, the amplified control signals Hgd and Lgd output from the integrated circuit 500, which are the amplified control signals Hgd and Lgd output by the gate drivers 521 and 522, and are also signals obtained by modulating the base drive signal do and the base drive signal ao.

The reference voltage generation circuit 530 generates a reference voltage signal VBS supplied to the electrode 612 of the piezoelectric element 60 and outputs the reference voltage signal VBS to the electrode 612 of the piezoelectric element 60 via the terminal Vbs of the integrated circuit 500. Such a reference voltage generation circuit 530 is configured with, for example, a constant voltage circuit including a bandgap reference circuit.

In FIG. 10, the reference voltage generation circuit 530 has been described as being included in the integrated circuit 500 included in the drive signal output circuit 51, but the reference voltage generation circuit 530 may be configured outside the integrated circuit 500 and may be further configured outside the drive signal output circuit 51.

The amplification circuit 550 includes a transistor M1 and a transistor M2. The voltage VHV is supplied to a drain of the transistor M1. A gate of the transistor M1 is electrically coupled to one end of a resistor R1 and the other end of the resistor R1 is electrically coupled to the terminal Hdr of the integrated circuit 500. That is, the amplified control signal Hgd output from the terminal Hdr of the integrated circuit 500 is supplied to the gate of the transistor M1. A source of the transistor M1 is electrically coupled to the terminal Sw of the integrated circuit 500.

A drain of the transistor M2 is electrically coupled to the terminal Sw of the integrated circuit 500. That is, the drain of the transistor M2 and the source of the transistor M1 are electrically coupled to each other. A gate of the transistor M2 is electrically coupled to one end of a resistor R2, and the other end of the resistor R2 is electrically coupled to the terminal Ldr of the integrated circuit 500. That is, the amplified control signal Lgd output from the terminal Ldr of the integrated circuit 500 is supplied to the gate of the transistor M2. A ground potential is supplied to the source of the transistor M2.

In the amplification circuit 550 configured as described above, when the transistor M1 is controlled to be turned off and the transistor M2 is controlled to be turned on, the voltage of the node to which the terminal Sw is coupled becomes a ground potential. Therefore, the voltage Vm is supplied to the terminal Bst. On the other hand, when the transistor M1 is controlled to be turned on and the transistor M2 is controlled to be turned off, the voltage of the node to which the terminal Sw is coupled becomes the voltage VHV. Therefore, a voltage signal having a potential of voltage VHV+Vm is supplied to the terminal Bst.

That is, the gate driver 521, which drives the transistor M1, supplies the amplified control signal Hgd, in which the L level is the potential of voltage VHV and the H level is a potential of voltage VHV+ voltage Vm, to the gate of the transistor M1 by changing the potential of the terminal Sw to 0 V or the voltage VHV according to the operation of the transistor M1 and the transistor M2 using the capacitor C5 as a floating power supply.

On the other hand, the gate driver 522, which drives the transistor M2, supplies the amplified control signal Lgd, in which L level is the ground potential and the H level is a potential with the voltage Vm, to the gate of the transistor M2 regardless of the operation of the transistor M1 and the transistor M2.

As described above, the amplification circuit 550 amplifies the modulation signal Ms in which the base drive signals do and ao are modulated by the transistor M1 and the transistor M2, based on the voltage VHV. As a result, the amplified modulation signal AMs is generated at a coupling point to which the source of the transistor M1 and the drain of the transistor M2 are commonly coupled. The amplified modulation signal AMs generated by the amplification circuit 550 is input to the demodulation circuit 560.

The demodulation circuit 560 generates the drive signal COM by demodulating the amplified modulation signal AMs output from the amplification circuit 550 and outputs the drive signal COM from the drive signal output circuit 51.

The demodulation circuit 560 includes an inductor L1 and capacitors C1*a* and C1*b*. One end of the inductor L1 is coupled to each one end of the capacitors C1*a* and C1*b*. Further, the amplified modulation signal AMs output from the amplification circuit 550 is input to the other end of the inductor L1, and the ground potential is supplied to the other ends of the capacitors C1*a* and C1*b*. That is, in the demodulation circuit 560, the capacitor C1*a* and the capacitor C1*b* are coupled in parallel, and the inductor L1 and the capacitors C1*a* and C1*b* constitute a low pass filter. The demodulation circuit 560 demodulates the amplified modulation signal AMs output from the amplification circuit 550 by smoothing thereof with the low pass filter, and outputs the demodulated signal as the drive signal COM.

The feedback circuit 570 includes a resistor R3 and a resistor R4. The drive signal COM is supplied to one end of the resistor R3, and the other end is coupled to each one end of the terminal Vfb and the resistor R4. The voltage VHV is supplied to the other end of the resistor R4. As a result, the drive signal COM passing through the feedback circuit 570 is fed back to the terminal Vfb in a state of being pulled up with the voltage VHV.

The feedback circuit 572 includes capacitors C2, C3, and C4, and resistors R5, and R6. The drive signal COM is supplied to one end of the capacitor C2, and the other end is coupled to one end of the resistor R5 and one end of the resistor R6. The ground potential is supplied to the other end of the resistor R5. As a result, the capacitor C2 and the resistor R5 function as a high pass filter. The cutoff frequency of this high pass filter is set to, for example, substantially 9 MHz. Further, the other end of the resistor R6 is coupled to one end of the capacitor C4 and one end of the capacitor C3. The ground potential is supplied to the other end of the capacitor C3. As a result, the resistor R6 and the capacitor C3 function as the low pass filter. The cutoff frequency of this low pass filter is set to, for example, substantially 160 MHz. That is, the feedback circuit 572 includes the high pass filter and the low pass filter and functions as a band pass filter for allowing a signal to pass in a predetermined frequency range included in the drive signal COM.

The other end of the capacitor C4 is coupled to the terminal Ifb of the integrated circuit 500. As a result, of the high frequency components of the drive signal COM passing through the feedback circuit 572 that functions as the band pass filter, the signal in which the direct-current component is cut is fed back to the terminal Ifb.

By the way, the drive signal COM is a signal obtained by smoothing the amplified modulation signal AMs based on the base drive signal do by the demodulation circuit 560. The drive signal COM is integrated and subtracted via the terminal Vfb and then fed back to the adder 512. Therefore, the drive signal output circuit 51 performs self-excited oscillation at a frequency determined by the feedback delay and the feedback transmit functions. However, since the feedback path via the terminal Vfb has a large amount of delay, the frequency of the self-excited oscillation may not be made to be high enough to ensure the accuracy of the drive signal COM only by feedback via the terminal Vfb. Therefore, by providing a path for feeding back the high frequency component of the drive signal COM via the terminal Ifb separately from the path via the terminal Vfb, the delay in the entire circuit is reduced. As a result, the frequency of the voltage signal Os can be made to be high enough to ensure the accuracy of the drive signal COM as compared with the case where the path via the terminal Ifb does not exist.

The oscillation frequency of the self-excited oscillation in the drive signal output circuit 51 in the present embodiment is desirably 1 MHz or higher and 8 MHz or lower at a viewpoint of reducing heat generation generated in the drive signal output circuit 51 while ensuring sufficient accuracy of the drive signal COM, and in particular, the oscillation frequency of the self-excited oscillation of the drive signal output circuit 51 is desirably 1 MHz or higher and 4 MHz or lower when reducing the power consumption of the liquid discharging apparatus 1. In other words, the frequency of the amplified modulation signal AMs, which is the drive frequencies of the transistors M1 and M2 and output by the amplification circuit 550 including the transistors M1 and M2, is desirably 1 MHz or higher and 8 MHz or lower at a viewpoint of reducing the heat generation generated in the transistors M1 and M2, and the frequency is desirably 1 MHz or higher and 4 MHz or lower when reducing the power consumption of the liquid discharging apparatus 1 by further reducing the loss caused by the transistors M1 and M2.

In the liquid discharging apparatus 1 of the present embodiment, the drive signal output circuit 51 generates the drive signal COM by smoothing the amplified modulation signal AMs and supplies the drive signal COM to the piezoelectric element 60 included in the print head 20. The piezoelectric element 60 is driven by supplying the trapezoidal waveform included in the drive signal COM, and the amount of ink corresponding to the drive of the piezoelectric element 60 is discharged from the discharging portion 600.

It is known that when a frequency spectrum analysis is performed on the signal waveform of the drive signal COM that drives the piezoelectric element 60, the drive signal COM includes a frequency component of 50 kHz or higher. In a case of generating a signal waveform of the drive signal COM including such a frequency component of 50 kHz or higher, when the frequency of the modulation signal is made lower than 1 MHz, an edge portion of the signal waveform of the drive signal COM output from the drive signal output circuit 51 becomes dull. In other words, in order to accurately generate the signal waveform of the drive signal COM, the frequency of the modulation signal Ms needs to be 1 MHz or higher. In other words, when the frequency of the amplified modulation signal AMs, which is the oscillation frequency of the self-excited oscillation of the drive signal output circuit 51 and corresponds to the drive frequencies of transistors M1 and M2, is defined as 1 MHz or lower, the waveform accuracy of the drive signal COM is decreased, and the drive accuracy of the piezoelectric element 60 is decreased. As a result, the discharge characteristics of the ink discharged from the liquid discharging apparatus 1 deteriorate.

In response to such a problem, by defining the frequency of the modulation signal Ms and the frequency of the amplified modulation signal AMs, which is the oscillation frequency of the self-excited oscillation of the drive signal output circuit 51 and corresponds to the drive frequencies of transistors M1 and M2, as 1 MHz or higher, the possibility that the edge portion of the signal waveform of the drive signal COM is dull is reduced, and the waveform accuracy of the signal waveform of the drive signal COM is improved. As a result, the drive accuracy of the piezoelectric element 60 driven based on the drive signal COM is improved, and the possibility that the discharge characteristics of the ink discharged from the liquid discharging apparatus 1 deteriorates is reduced.

However, when the frequency of the modulation signal Ms and the drive frequencies of the transistors M1 and M2, which is the oscillation frequency of the self-excited oscillation of the drive signal output circuit 51, are made to be high, a switching loss in the transistors M1 and M2 becomes large. The switching loss caused by such transistors M1 and M2 increases the power consumption in the drive signal output circuit 51 and also increases the amount of heat generated in the drive signal output circuit 51. That is, when the drive frequencies of the transistors M1 and M2, which are the oscillation frequency of the self-excited oscillation of the drive signal output circuit 51, are made to be too high, the switching loss in the transistors M1 and M2 becomes large, and as a result, the power saving performance and the heat saving performance, which are one of the advantages of the class D amplifier over linear amplification such as the class AB amplifier, are impaired. The frequency of the modulation signal Ms and the frequency of the amplified modulation signal AMs, which is the oscillation frequency of the self-excited oscillation of the drive signal output circuit 51 and corresponds to the drive frequencies of the transistors M1 and M2, are desirably 8 MHz or lower at a viewpoint of reducing the switching loss of such transistors M1 and M2, and in particular, the frequency of the amplified modulation signal AMs is desirably 4 MHz or lower when it is required to improve the power saving performance of the liquid discharging apparatus 1.

As described above, the frequency of the amplified modulation signal AMs, which is the oscillation frequency of the self-excited oscillation of the drive signal output circuit 51 and corresponds to the drive frequencies of the transistors M1 and M2, is desirably 1 MHz or higher and 8 MHz or lower at a viewpoint of achieving both improvement in the accuracy of the signal waveform of the drive signal COM to be output and the power saving performance in the drive signal output circuit 51 using the class D amplifier, and in particular, the frequency of the amplified modulation signal AMs is desirably 1 MHz or higher and 4 MHz or lower when reducing the power consumption of the liquid discharging apparatus 1.

The drive signal COM output by the drive signal output circuit 51 is selected or not selected in the selection circuit 230 and then is supplied to the piezoelectric element 60 as the drive signal VOUT. Therefore, an output current based on the drive signal COM output by the drive signal output circuit 51 changes greatly according to the number of piezoelectric elements 60 supplied as the drive signal VOUT. When the output current output by the drive signal output circuit 51 changes greatly, the voltage value of the voltage VHV input to the drive signal output circuit 51 may fluctuate. As a result, the waveform accuracy of the amplified modulation signal AMs, which is generated by amplifying the modulation signal Ms based on the voltage VHV, and the drive signal COM, which is generated by demodulating the amplified modulation signal AMs, may be decreased.

In response to such a problem, the drive signal output circuit 51 in the present embodiment includes a capacitor C6 for reducing the possibility of voltage fluctuation in the voltage VHV supplied to the drive signal output circuit 51 even when the amount of current based on the drive signal COM changes. The capacitor C6 is electrically coupled to a propagation path through which the voltage VHV that is input to the amplification circuit 550 propagates. Such a capacitor C6 is a capacitive element having a relatively large capacitance in order to reduce the voltage fluctuation of the voltage VHV with respect to a large change in the output current caused by the drive signal COM and is required to have a withstand voltage equal to or larger than the voltage value of the voltage VHV. Therefore, the capacitor C6 is desirably an electrolytic capacitor having a relatively large capacitance and the withstand voltage of several tens of volts or larger. As a result, even when the output current output by the drive signal output circuit 51 changes greatly, the possibility that the voltage value of the voltage VHV fluctuates can be reduced, and as a result, the waveform accuracy of the drive signal COM output by the drive signal output circuit 51 is improved.

Figure 11:
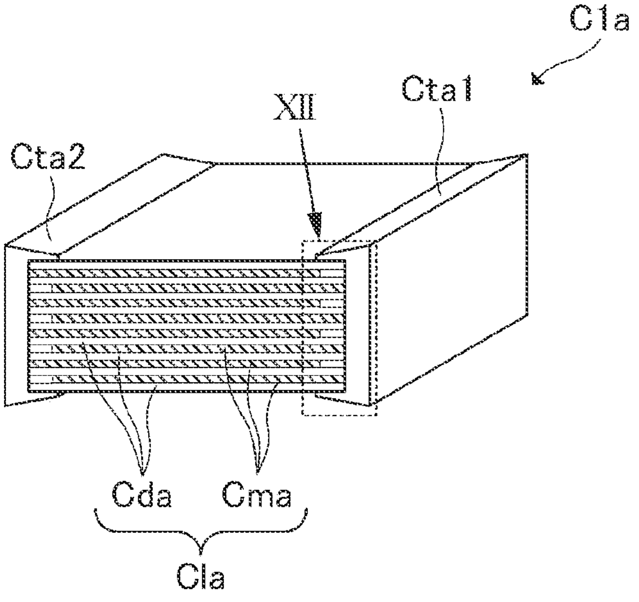
FIG. 11 is a cross-sectional view illustrating a structure of a capacitor.

Further, in the drive signal output circuit 51 of the present embodiment, the capacitors C1*a* and C1*b* included in the demodulation circuit 560 have different structures and have different characteristics from each other. Therefore, a specific example of the configuration of the capacitors C1*a* and C1*b* and the difference in characteristics will be described. FIG. 11 is a cross-sectional view illustrating the structure of the capacitor C1*a*. As illustrated in FIG. 11, the capacitor C1*a* is a laminated surface mounting component having a laminated portion C1*a* and external electrodes Cta1 and Cta2 provided at both ends of the laminated portion C1*a*.

The laminated portion C1*a* has a resin thin film layer Cda and a metal thin film layer Cma that are alternately laminated. The fact that the resin thin film layer Cda and the metal thin film layer Cma are alternately laminated in the laminated portion C1*a* includes the fact that two or more resin thin film layers Cda are laminated between two metal thin film layers Cma. That is, the fact that the resin thin film layer Cda and the metal thin film layer Cma are alternately laminated in the laminated portion C1*a* includes a case where the single-layered metal thin film layer Cma, and the single-layered or multi-layered resin thin film layers Cda are alternately laminated. The capacitor C1*a* forms a capacitive element having a sufficient electrostatic capacitance by alternately laminating the resin thin film layer Cda and the metal thin film layer Cma over several thousand layers in the laminated portion C1*a*.

The resin thin film layer Cda is a sheet-shaped resin thin film such as a plastic film having a dielectric property and various resin materials having the dielectric property such as polyethylene terephthalate (PET), polypropylene (PP), polyphenylene sulfide (PPS), and acrylic resin can be used. Considering that the capacitor C1*a* in the present embodiment is a surface mounting component as described above, the resin thin film layer Cda is a thermosetting resin having a high heat resistance property, and for example, an acrylic resin is desirably used.

The metal thin film layer Cma is a metal thin film formed on the resin thin film layer Cda by vapor deposition or the like and is made of aluminum or the like having high conductivity. The metal thin film layer Cma is alternately electrically coupled to the external electrode Cta1 and the external electrode Cta2 provided at both ends of the laminated portion C1*a*. Specifically, among the laminated metal thin film layers Cma, the metal thin film layer Cma of 2p layer (p is an integer of 1 or larger) is electrically coupled to the external electrode Cta1, and the metal thin film layer Cma of (2p+1) layer is electrically coupled to the external electrode Cta2. The metal thin film layer Cma may be any substance as long as it has excellent conductivity and can be formed on the resin thin film layer Cda by the vapor deposition or the like, and for example, gold or the like may be used.

A specific example of the electrical coupling between the external electrodes Cta1 and Cta2, and the metal thin film layer Cma will be described. The external electrode Cta1 and the external electrode Cta2 differ only in the metal thin film layer Cma, which is electrically coupled, and have the same configuration. Therefore, in the following description, only the electrical coupling between the external electrode Cta1 and the metal thin film layer Cma will be described, and the description of the electrical coupling between the external electrode Cta2 and the metal thin film layer Cma will be omitted.

Figure 12:
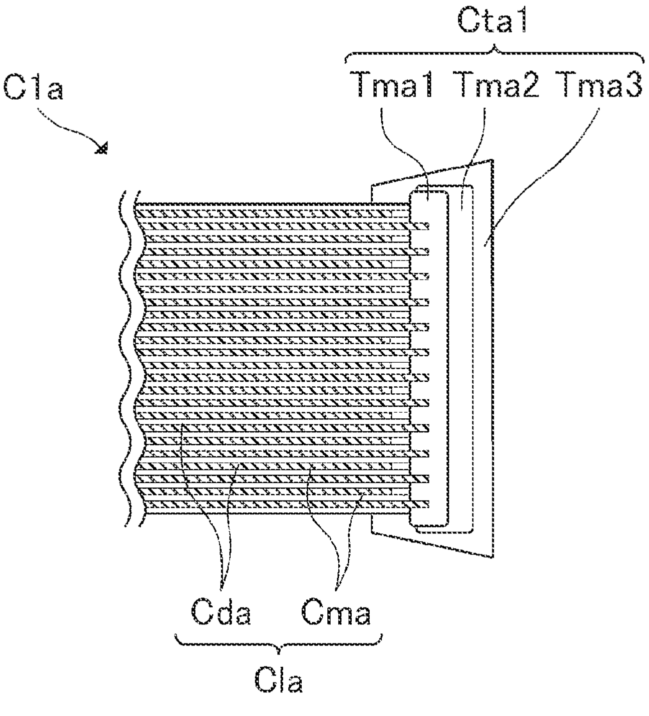
FIG. 12 is an enlarged view of an XII portion illustrated in FIG. 11.

FIG. 12 is a view illustrating an example of an electrical coupling between the external electrode Cta1 and the metal thin film layer Cma and is an enlarged view of an XII portion illustrated in FIG. 11. As illustrated in FIG. 12, the external electrode Cta1 includes an electrode Tma1, an electrode Tma2, and an electrode Tma3.

The electrode Tma1 is electrically coupled to the metal thin film layer Cma. This electrode Tma1 is an electrode including brass and enhances an electrical bonding property with the electrode Tma2 described later. Such an electrode Tma1 may be referred to as a metalicon electrode in the capacitor C1*a*. The electrode Tma2 is provided so as to cover the electrode Tma1. The electrode Tma2 has a configuration for integrally electrically coupling a multi-layered metal thin film layer Cma that is electrically coupled via the electrode Tma1 and includes copper having excellent conductivity. The electrode Tma3 is provided so as to cover the electrode Tma2. The electrode Tma3 is electrically coupled to the substrate on which the drive signal output circuit 51 is mounted. That is, the electrode Tma3 is electrically coupled to a substrate (not illustrated) by using a bonding method such as solder. The electrode Tma3 is configured to include tin for the purpose of improving the electrical coupling between the capacitor C1*a* and the substrate by improving the wettability of the solder.

As described above, the external electrode Cta1 included in the capacitor C1*a* has an electrode Tma1 made of brass and electrically coupled to the metal thin film layer Cma, an electrode Tma2 made of copper and provided so as to cover the electrode Tma1, and an electrode Tma3 made of tin and provided so as to cover the electrode Tma2. As a result, the electrical coupling performance between the capacitor C1*a* and the substrate (not illustrated) provided with the drive signal output circuit 51 can be improved, and the electrical coupling property between the laminated metal thin film layers Cma included in the capacitor C1*a* can be enhanced. Therefore, the reliability of the capacitor C1*a* is improved.

The capacitor C1*a* has an electrostatic capacitance in accordance with an effective cross-sectional area of the metal thin film layer Cma electrically coupled to the external electrode Cta1 and the metal thin film layer Cma electrically coupled to the external electrode Cta2, and a dielectric constant of the resin thin film layer Cda provided between the two metal thin film layers Cma. Therefore, the metal thin film layer Cma may be processed with a specific pattern shape for adjusting the effective cross-sectional area of the metal thin film layer Cma electrically coupled to the external electrode Cta1 and the metal thin film layer Cma electrically coupled to the external electrode Cta2. As a result, the electrostatic capacitance that is included in the capacitor C1*a* is defined.

The capacitor C1*a* configured as described above is an example of a first capacitor, the metal thin film layer Cma is an example of a first metal thin film layer, and the laminated portion C1*a* in which the resin thin film layer Cda and the metal thin film layer Cma are laminated is an example of a first laminated portion. Further, the electrode Tma1 is an example of a first electrode, the electrode Tma2 is an example of a second electrode, and the electrode Tma3 is an example of a third electrode.

Figure 13:
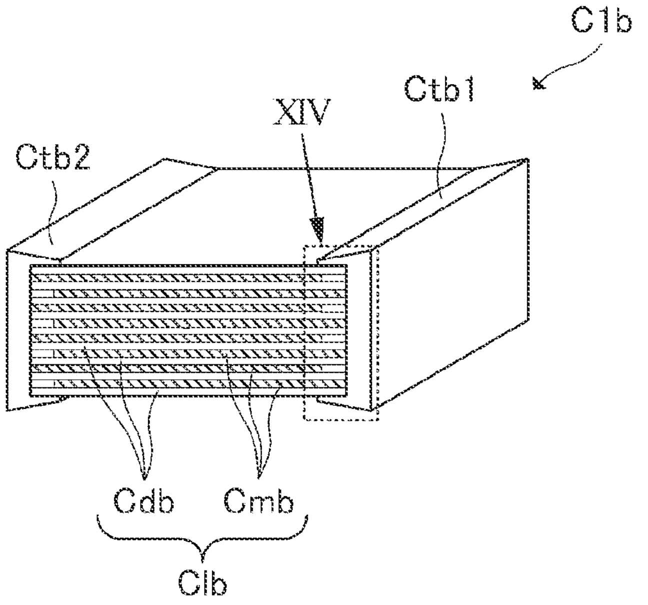
FIG. 13 is a cross-sectional view illustrating a structure of a capacitor.

FIG. 13 is a cross-sectional view illustrating the structure of the capacitor C1*b*. As illustrated in FIG. 13, the capacitor C1*b* is a laminated surface mounting component having a laminated portion C1*b* and external electrodes Ctb1 and Ctb2 provided at both ends of the laminated portion C1*b*.

The laminated portion C1*b* has a ceramic thin film layer Cdb and a metal thin film layer Cmb that are alternately laminated. The fact that the ceramic thin film layer Cdb and the metal thin film layer Cmb are alternately laminated in the laminated portion C1*b* includes the fact that two or more ceramic thin film layers Cdb are laminated between two metal thin film layers Cmb. That is, the fact that the ceramic thin film layer Cdb and the metal thin film layer Cmb are alternately laminated in the laminated portion C1*b* includes a case where the single-layered metal thin film layers Cmb and the single-layered or multi-layered ceramic thin film layers Cdb are alternately laminated. The capacitor C1*b* forms a capacitive element having a sufficient electrostatic capacitance by alternately laminating the ceramic thin film layer Cdb and the metal thin film layer Cmb over several thousand layers in the laminated portion C1*b*.

As the ceramic thin film layer Cdb, titanium oxide-based formed in a sheet shape, or zirconate-based ceramics or barium titanate-based ceramics, which are made of ceramic materials having a dielectric property, can be used.

The metal thin film layer Cmb is a metal thin film formed on the ceramic thin film layer Cdb by vapor deposition or the like and is made of aluminum, nickel, palladium, or the like having high conductivity. The metal thin film layer Cmb is alternately electrically coupled to the external electrode Ctb1 and the external electrode Ctb2 provided at both ends of the laminated portion C1*b*. Specifically, among the laminated metal thin film layers Cmb the metal thin film layer Cmb of 2q layer (q is an integer of 1 or larger) is electrically coupled to the external electrode Ctb1, and the metal thin film layer Cmb of (2q+1) layer is electrically coupled to the external electrode Ctb2. The metal thin film layer Cmb may be any substance as long as it has excellent conductivity and can be formed on the ceramic thin film layer Cdb by the vapor deposition or the like, and for example, gold or the like may be used.

A specific example of the electrical coupling between the external electrodes Ctb1 and Ctb2, and the metal thin film layer Cma will be described. The external electrode Ctb1 and the external electrode Ctb2 differ only in the metal thin film layer Cmb, which is electrically coupled, and have the same configuration. Therefore, in the following description, only the electrical coupling between the external electrode Ctb1 and the metal thin film layer Cmb will be described, and the description of the electrical coupling between the external electrode Ctb2 and the metal thin film layer Cmb will be omitted.

Figure 14:
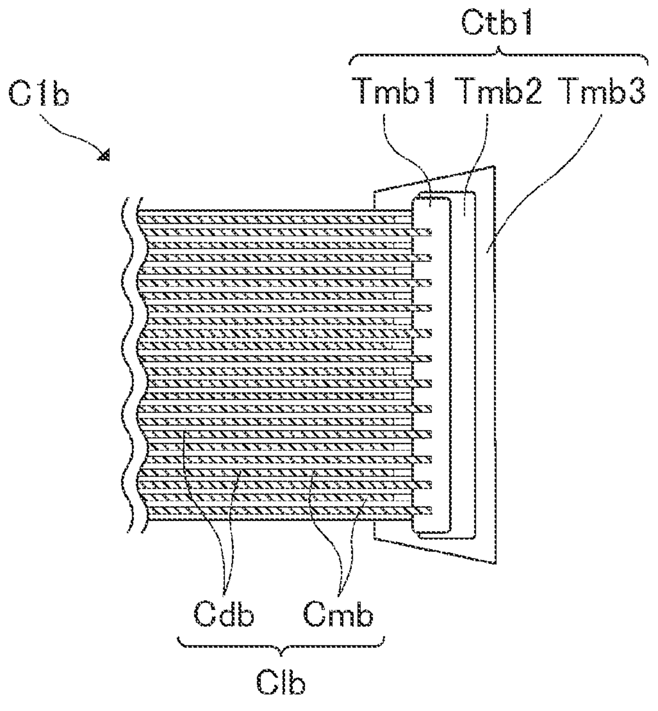
FIG. 14 is an enlarged view of a XIV portion illustrated in FIG. 13.

FIG. 14 is a view illustrating an example of an electrical coupling between the external electrode Ctb1 and the metal thin film layer Cmb and is an enlarged view of an XIV portion illustrated in FIG. 13. As illustrated in FIG. 14, the external electrode Ctb1 includes an electrode Tmb1, an electrode Tmb2, and an electrode Tmb3.

The electrode Tmb1 is electrically coupled to the metal thin film layer Cmb. The electrode Tmb1 is a base electrode in the external electrode Ctb1 and includes, for example, silver and copper. The electrodes Tmb2 and Tmb3 are plating electrodes applied to the electrode Tmb1, and for example, nickel or tin is used. The external electrode Ctb1 configured as described above electrically couples a plurality of metal thin film layers Cmb collectively in the electrode Tmb1 electrically coupled to the metal thin film layer Cmb, can improve the electrical coupling performance between the capacitor C1*b* and the substrate provided with the drive signal output circuit 51 by providing the electrodes Tmb2 and Tmb3 including nickel, tin, or the like so as to cover the electrode Tmb1, and can enhance the electrical coupling property between the laminated metal thin film layers Cmb included in the capacitor C1*b*. Therefore, the reliability of the capacitor C1*b* is improved.

The capacitor C1*b* has an electrostatic capacitance in accordance with an effective cross-sectional area of the metal thin film layer Cmb electrically coupled to the external electrode Ctb1 and the metal thin film layer Cmb electrically coupled to the external electrode Ctb2, and a dielectric constant of the ceramic thin film layer Cdb provided between the two metal thin film layers Cmb. Therefore, the metal thin film layer Cmb may be processed with a specific pattern shape for adjusting the effective cross-sectional area of the metal thin film layer Cmb electrically coupled to the external electrode Ctb1 and the metal thin film layer Cmb electrically coupled to the external electrode Ctb2. As a result, the electrostatic capacitance that is included in the capacitor C1*b* is defined.

The capacitor C1*b* is an example of a second capacitor, the metal thin film layer Cmb is an example of a second metal thin film layer, and the laminated portion C1*b* is an example of a second laminated portion.

As described above, in the drive signal output circuit 51 of the present embodiment, the capacitor C1*a* included in the demodulation circuit 560 has a laminated portion C1*a* in which the resin thin film layer Cda and the metal thin film layer Cma are laminated, and the capacitor C1*b* has the laminated portion C1*b* in which the ceramic thin film layer Cdb and the metal thin film layer Cmb are laminated. That is, the demodulation circuit 560 has the capacitor C1*a* and the capacitor C1*b* having different configurations from each other. Therefore, the characteristics of the capacitor C1*a* and the capacitor C1*b* are also different from each other.

Figure 15:
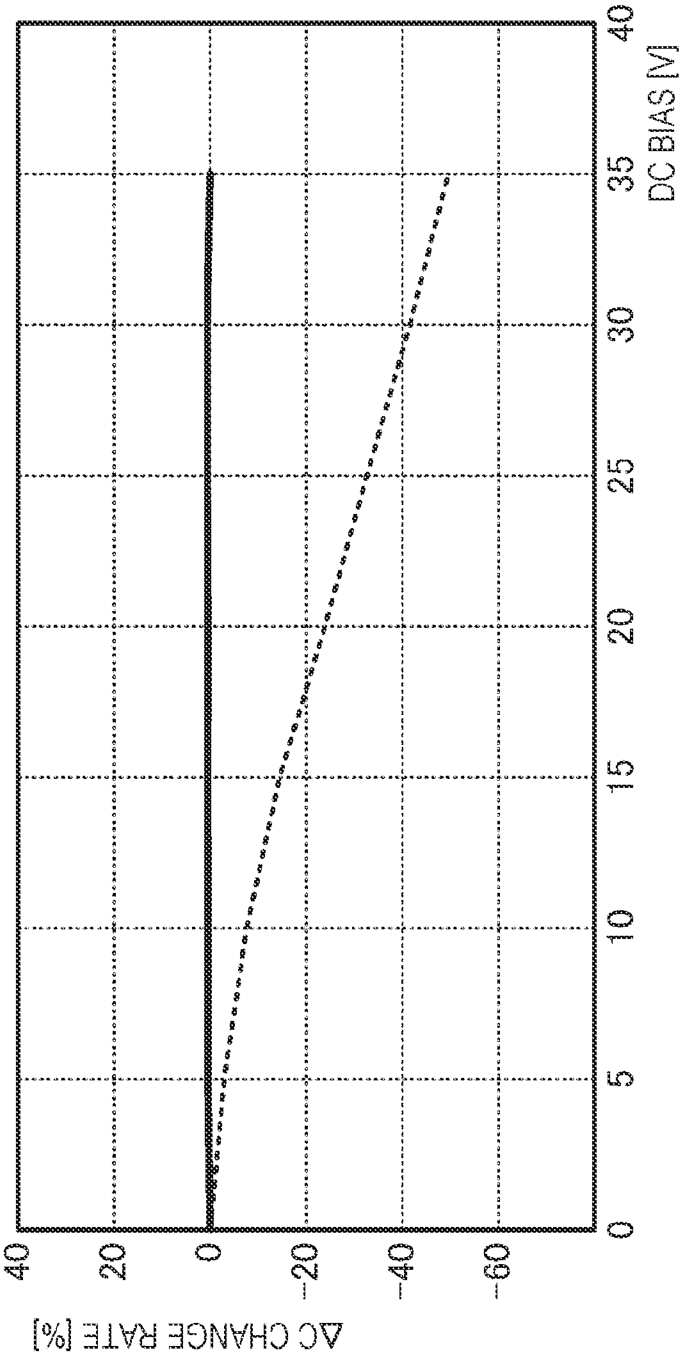
FIG. 15 is a view illustrating an example of direct-current bias characteristics of the capacitors.

First, the direct-current bias characteristics of the capacitors C1*a* and C1*b* will be compared. FIG. 15 is a view illustrating an example of the direct-current bias characteristics of the capacitors C1*a* and C1*b*. In FIG. 15, the direct-current bias characteristics of the capacitor C1*a* are indicated by a solid line, and an example of the direct-current bias characteristics of the capacitor C1*b* are indicated by a broken line. When the direct-current bias characteristics of the capacitors C1*a* and C1*b* as illustrated in FIG. 15 are compared, a change rate of the electrostatic capacitance of the capacitor C1*a* when the direct-current voltage is supplied to the capacitor C1*a* is smaller than the change rate of the electrostatic capacitance of the capacitor C1*b* when the direct-current voltage is supplied to capacitor C1*b*.

As described above, the capacitor C1*a* has the resin thin film layer Cda as a dielectric, whereas the capacitor C1*b* has the ceramic thin film layer Cdb as a dielectric. Regarding the ceramic material such as barium titanate included in the capacitor C1*b* as a dielectric, when the direct-current voltage to be supplied becomes large, alignment of spontaneous polarization that is originally in a disjointed direction is started, the polarization is saturated after completing the alignment of the spontaneous polarization, and then the dielectric performance is decreased. That is, the capacitor C1*a* has more excellent the direct-current bias characteristics than that of the capacitor C1*b*.

Figure 16:
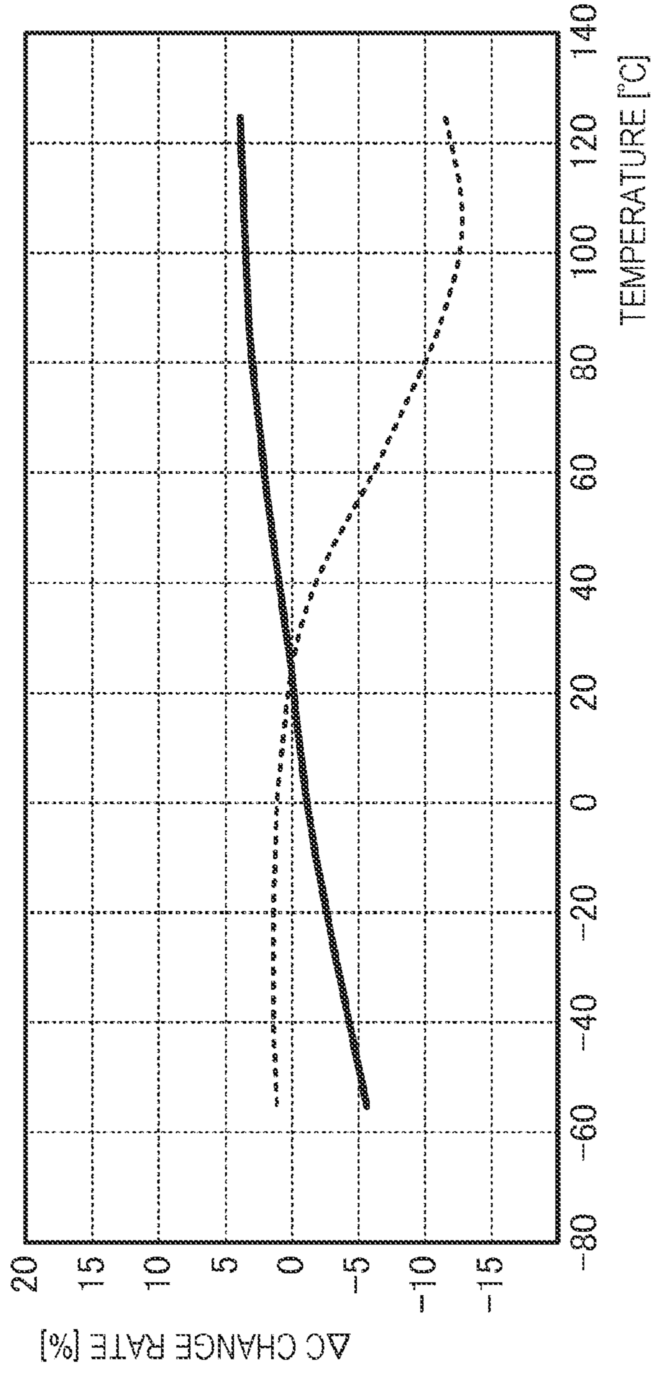
FIG. 16 is a view illustrating an example of temperature characteristics of the capacitors.

Next, temperature characteristics of the capacitors C1*a* and C1*b* will be compared. FIG. 16 is a view illustrating an example of the temperature characteristics of the capacitors C1*a* and C1*b*. As illustrated in FIG. 16, when the temperature characteristics of the capacitors C1*a* and C1*b* are compared, in the liquid discharging apparatus 1, the change rate of the electrostatic capacitance of the capacitor C1*a* in a range of −20° C. to +60° C., which is assumed as the ambient temperature of the capacitors C1*a* and C1*b*, can be made smaller than the change rate of the electrostatic capacitance of capacitor C1*b*.

This is because the capacitor C1*a* has the resin thin film layer Cda as the dielectric so that the range of material selection for the dielectric is widened. That is, in the capacitor C1*a*, it is possible to select, for example, an acrylic resin, which has a small change in electrostatic capacitance due to the temperature as a dielectric, and as a result, the capacitor C1*a* can achieve better temperature characteristics than the capacitor C1*b*.

Figure 17:
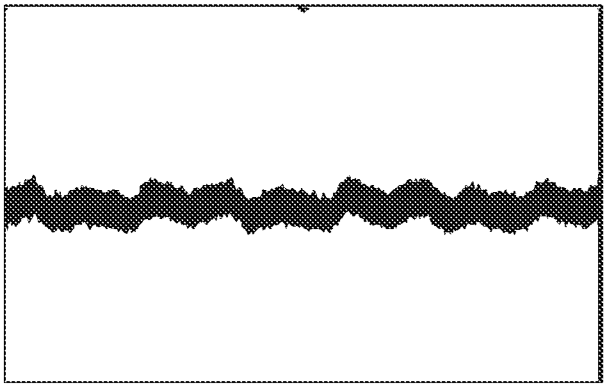
FIG. 17 is a view illustrating an example of voltage fluctuations that occur at both ends of the capacitor when vibration caused by a motor drive is applied to the capacitor.

Further, the characteristics of the capacitor C1*a* and the capacitor C1*b* are also different from each other in whether or not noise caused by the vibration is superimposed when the vibration is applied. FIG. 17 is a view illustrating the voltage fluctuation that occurs at the both ends of the capacitor C1*a* when the vibration caused by the motor drive is applied to the capacitor C1*a* in the present embodiment, and FIG. 18 is a view illustrating the voltage fluctuation that occurs at both ends of the capacitor when the vibration caused by the motor drive is applied to the capacitor C1*b*.

Figure 18:
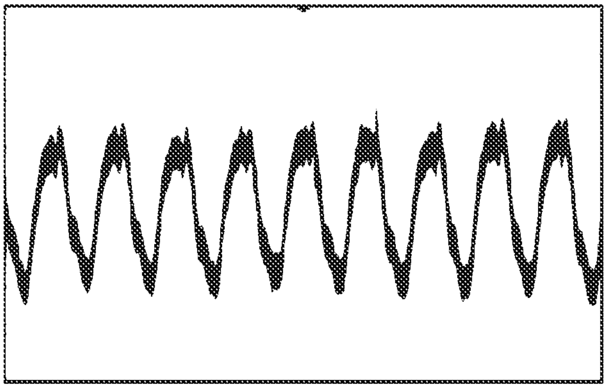
FIG. 18 is a view illustrating an example of voltage fluctuations that occur at both ends of the capacitor when vibration caused by a motor drive is applied to the capacitor.

As illustrated in FIG. 17, in the capacitor C1*a*, the noise caused by the vibration is not superimposed on both ends even when vibration is applied, whereas as illustrated in FIG. 18, the noise caused by the vibration is superimposed on both ends of the capacitor C1*b* when the vibration is applied to the capacitor C1*b*. The vibration is applied because the capacitor C1*b* has the ceramic thin film layer Cdb as a dielectric, thereby the noise superimposed on the capacitor C1*b* is caused by the piezoelectric voltage generated in the ceramic thin film layer Cdb that is a dielectric. That is, the capacitor C1*a* has more excellent vibration resistance property than that of the capacitor C1*b*.

Figure 19:
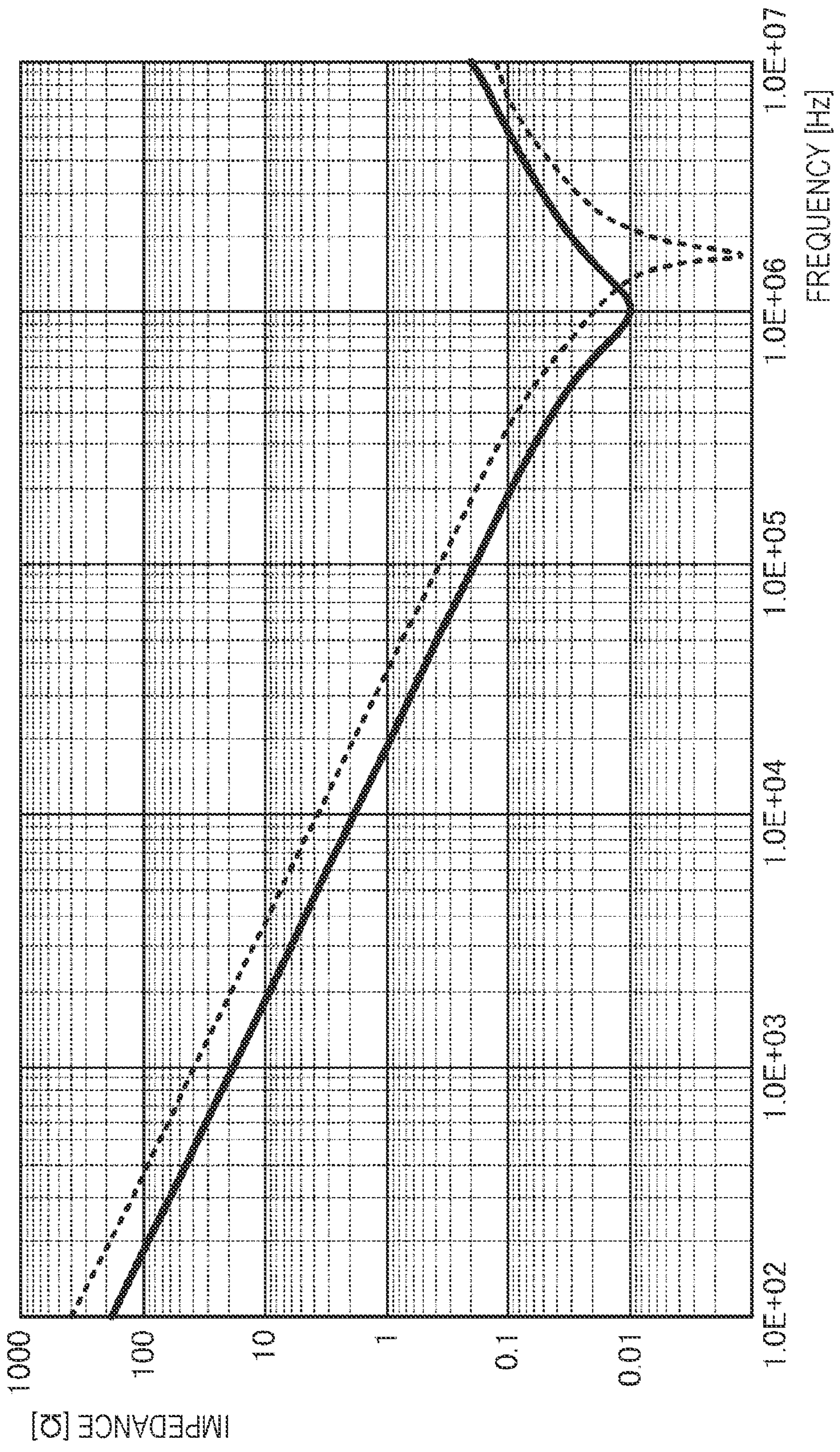
FIG. 19 is a view illustrating an example of frequency characteristics of the capacitors.

Next, frequency characteristics of the capacitors C1*a* and C1*b* will be compared. FIG. 19 is a view illustrating an example of the frequency characteristics of the capacitors C1*a* and C1*b*. In FIG. 19, the frequency characteristics of the capacitor C1*a* are indicated by a solid line, and an example of the frequency characteristics of the capacitor C1*b* is indicated by a broken line.

As illustrated in FIG. 19, when the frequency characteristics of the capacitors C1*a* and C1*b* are compared, the equivalent series resistance component of the capacitor C1*b* is smaller than the equivalent series resistance component of the capacitor C1*a*. Therefore, in the drive signal output circuit 51 in which the high frequency is supplied to the capacitors C1*a* and C1*b*, the loss caused by the capacitor C1*a* is larger than the loss caused by the capacitor C1*b*. That is, the capacitor C1*b* has more excellent frequency characteristics than that of the capacitor C1*a*.

As described above, when the capacitor C1*a*, which is configured to include the laminated portion C1*a* in which the resin thin film layer Cda and the metal thin film layer Cma are laminated, and the capacitor C1*b*, which includes the laminated portion C1*b* in which the ceramic thin film layer Cdb and the metal thin film layer Cmb, are laminated are compared, the capacitor C1*a* has more excellent direct-current bias characteristics, temperature characteristics, and vibration characteristics than those of the capacitor C1*b*, and the capacitor C1*b* has more excellent frequency characteristics than that of the capacitor C1*a*.

The drive signal output circuit 51 that outputs the drive signal COM in the liquid discharging apparatus 1 outputs the drive signal COM having a high voltage of 25 V or larger by smoothing the high-frequency amplified modulation signal AMs in the demodulation circuit 560. When the capacitors C1*a* and C1*b* included in the demodulation circuit 560 have a significant loss and a change in electrostatic capacitance, the waveform accuracy of the drive signal COM output by the drive signal output circuit 51 is decreased, and the image quality formed on the medium is decreased.

In the liquid discharging apparatus 1, at a viewpoint of improving the image formation speed on the medium P in recent years, since it is required to improve the efficiency of filling the dots formed on the medium P, the maximum voltage value of the drive signal COM output by the drive signal output circuit 51 rises to 25 V or more. On the other hand, at a viewpoint of improving the discharge accuracy of the ink to the medium P, the frequency of the amplified modulation signal AMs is also made to be high. That is, it is required that the significant change in the electrostatic capacitance does not occur even when the high voltage of direct-current voltage is applied to the capacitors C1*a* and C1*b* included in the demodulation circuit 560 of the drive signal output circuit 51 used in the liquid discharging apparatus 1, and the significant loss does not occur even when the high-frequency signal is supplied.

In response to such market demands, in the drive signal output circuit 51 in the present embodiment, by the demodulation circuit 560 to parallelly include the capacitor C1*a*, which includes the laminated portion C1*a* in which the resin thin film layer Cda and the metal thin film layer Cma having excellent direct-current bias characteristics are laminated, and the capacitor C1*b*, which includes the laminated portion C1*b* in which the ceramic thin film layer Cdb and the metal thin film layer Cmb having excellent frequency characteristics are laminated, in a combined capacitance including the capacitors C1*a* and C1*b*, the significant change in the electrostatic capacitance does not occur even when the high voltage of direct-current voltage is applied, and the significant loss does not occur even when the high-frequency signal is supplied. As a result, even when the maximum voltage value of the drive signal COM rises to 25 V or larger and the frequency of the amplified modulation signal AMs also made to be high, the possibility is reduced that the waveform accuracy of the drive signal COM is decreased. That is, it is possible to achieve both the acceleration of the image formation speed and the improvement of the discharge accuracy for the liquid discharging apparatus.

Further, in this case, it is desirable that the electrostatic capacitance of the capacitor C1*a* is larger than the electrostatic capacitance of the capacitor C1*b*. As illustrated in FIGS. 15 and 16, the fluctuation of the electrostatic capacitance of the capacitor C1*b* is very large with respect to the fluctuation of the electrostatic capacitance of the capacitor C1*a*, and in particular, when the direct-current voltage of 25 V or more is supplied, the electrostatic capacitance of the capacitor C1*b* is reduced by substantially 30%. In the demodulation circuit 560 in which the capacitor C1*a* and the capacitor C1*b* are provided in parallel, by making the electrostatic capacitance of the capacitor C1*a* larger than the electrostatic capacitance of the capacitor C1*b*, the electrostatic capacitance of the capacitor C1*a*, which has a small reduction in electrostatic capacitance, becomes dominant in the combined capacitance in the demodulation circuit 560. As a result, even when the direct-current voltage of 25 V or larger is supplied, the combined capacitance in the demodulation circuit 560 is reduced, and the possibility is reduced that the waveform accuracy of the drive signal COM is decreased.

6. Substrate Disposition of Drive Signal Output Circuit

Figure 20:
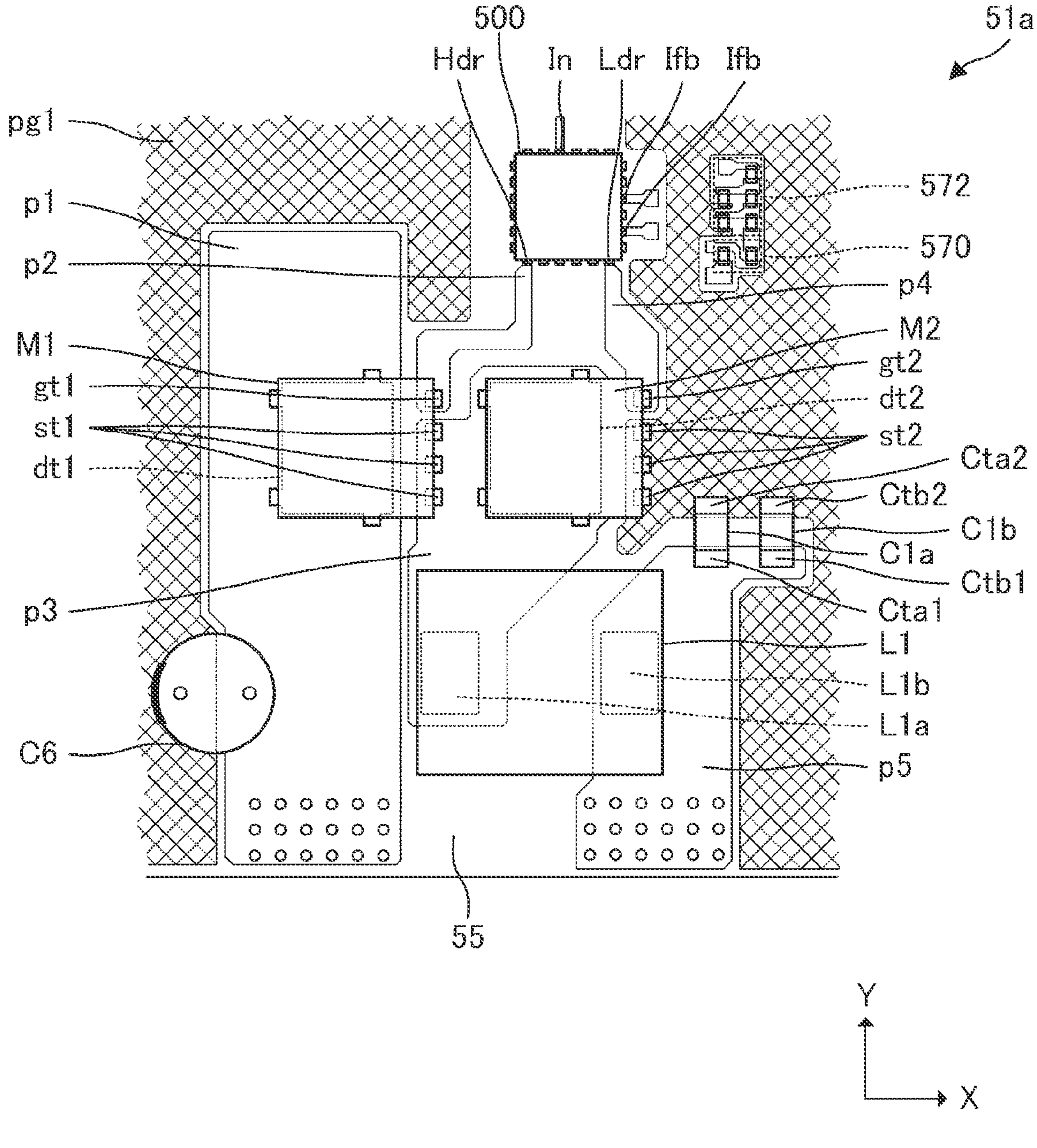
FIG. 20 is a view for describing a structure of the drive signal output circuit.

Next, the structure of the drive signal output circuit 51 configured as described above will be described. FIG. 20 is a view for describing a structure of the drive signal output circuit 51. In FIG. 20, the X direction and the Y direction, which are orthogonal to each other, will be used for description. Further, when a direction of the X direction is defined, the arrow starting point side illustrated in the figure may be referred to as the −X side, and the front end side may be referred to as the +X side. Similarly, when a direction of the Y direction is defined, the arrow starting point side illustrated in the figure may be referred to as the −Y side, and the front end side may be referred to as the +Y side.

Further, in FIG. 20, the source of the transistor M1 is illustrated as the terminal st1, the drain is illustrated as the terminal dt1, and the gate is illustrated as the terminal gt1. Similarly, the source of the transistor M2 is illustrated as the terminal st2, the drain is illustrated as the terminal dt2, and the gate is illustrated as the terminal gt2. Further, in FIG. 20, a part of circuit elements constituting the drive signal output circuit 51 are not illustrated.

As illustrated in FIG. 20, the drive signal output circuit 51 includes the integrated circuit 500, the transistors M1 and M2, the inductor L1, the capacitors C1*a* and C1*b*, and the substrate 55. The integrated circuit 500, the transistors M1 and M2, the inductor L1, and the capacitors C1*a* and C1*b* included in the drive signal output circuit 51 are provided on the same mounting surface of the substrate 55. That is, the liquid discharging apparatus 1 includes the substrate 55 on which a drive signal output circuit 51 is mounted, and the integrated circuit 500 including a modulation circuit 510, the amplification circuit 550 including transistors M1 and M2, and the demodulation circuit 560 including the capacitor C1*a*, the capacitor C1*b*, and the inductor L1 are provided on the same mounting surface of the substrate 55.

Further, the substrate 55 has a wiring pattern for electrically coupling various circuit elements including the integrated circuit 500, the transistors M1 and M2, the inductor L1, and the capacitors C1*a* and C1*b*. FIG. 20 illustrates only a surface layer on which the integrated circuit 500, the transistors M1 and M2, the inductor L1, and the capacitors C1*a* and C1*b* are mounted on the substrate 55, but the substrate 55 may be a so-called multi-layered substrate having a plurality of wiring layers inside.

The transistor M1 is provided such that the terminal gt1 and the terminal st1 are on the +X side and the terminal dt1 is on the −X side, and the transistor M2 is provided such that the terminal gt2 and the terminal st2 are on the +X side and the terminal dt2 is on the −X side on the +X side of the transistor M1. That is, the transistor M1 and the transistor M2 are provided in parallel along the X direction.

The integrated circuit 500 is positioned on the +Y side of the transistors M1 and M2 provided in parallel in the X direction. The terminal Hdr of the integrated circuit 500 and the terminal gt1 of the transistor M1 are electrically coupled via a wiring pattern p2, and the terminal Ldr of the integrated circuit 500 and the terminal gt2 of the transistor M2 are electrically coupled via a wiring pattern p4. Although not illustrated in FIG. 20, the wiring pattern p2 that couples the terminal Hdr and the terminal dt1 of the transistor M1 may include a resistor R1, or the wiring pattern p4 that couples the terminal Ldr and the terminal dt2 of the transistor M2 may include a resistor R2.

The inductor L1 is positioned on the −Y side of the transistors M1 and M2 provided in parallel along the X direction. That is, on the substrate 55, the integrated circuit 500, the transistors M1 and M2, and the inductor L1 are provided in parallel in the order of the integrated circuit 500, the transistors M1, M2, and the inductor L1 along the Y direction. The terminal L1*a* of the inductor L1, the terminal st1 of the transistor M1, and the terminal dt2 of the transistor M2 are electrically coupled via a wiring pattern p3. As a result, the amplified modulation signals AMs output from the terminal st1 of the transistor M1 and the terminal dt2 of the transistor M2 are supplied to the inductor L1 via the wiring pattern p3.

On the +X side of the transistors M1 and M2 and the inductor L1 provided in parallel along the X direction, the capacitors C1*a* and C1*b* are positioned in parallel along the X direction such that the capacitor C1*a* is on the −X side and the capacitor C1*b* is on the +X side. That is, the capacitor C1*a* is positioned closer to the inductor L1 than the capacitor C1*b*. In other words, the capacitors C1*a* and C1*b* are positioned such that the shortest distance between the inductor L1 and the capacitor C1*a* is shorter than the shortest distance between the inductor L1 and the capacitor C1*b*.

In this case, the capacitors C1*a* and C1*b* are provided on the substrate 55 such that a wiring resistance between the terminal L1*b* that is one end of the inductor L1 and the external electrode Cta1 that is one end of the capacitor C1*a* is smaller than a wiring resistance between the terminal L1*b* that is one end of the inductor L1 and the external electrode Cta2 that is one end of the capacitor C1*b*, and further a wiring length of the wiring for electrically coupling between the terminal L1*b* that is one end of the inductor L1 and the external electrode Cta1 that is one end of the capacitor C1*a* is shorter than a wiring length of the wiring for electrically coupling between the terminal L1*b* that is one end of the inductor L1 and the external electrode Ctb1 that is one end of the capacitor C1*b*.

The capacitor C6 is positioned on the −X side of the inductor L1.

In the drive signal output circuit 51 configured as described above, the voltage VHV is supplied to a wiring pattern p1. The wiring pattern p1 is electrically coupled to the + side terminal of the capacitor C6, which is an electrolytic capacitor, and the terminal dt1 of the transistor M1. Further, the terminal gt1 of the transistor M1 is electrically coupled to the terminal Hdr of the integrated circuit 500 via the wiring pattern p2, and the terminal st1 of the transistor M1 is electrically coupled to the wiring pattern p3. In such a transistor M1, whether or not the terminal dt1 and the terminal st1 are electrically coupled is switched according to the amplified control signal Hgd input via the wiring pattern p2.

Further, the terminal dt2 of the transistor M2 is electrically coupled to the wiring pattern p3. The terminal gt2 of the transistor M2 is electrically coupled to the terminal Ldr of the integrated circuit 500 via the wiring pattern p4, and the terminal st2 of the transistor M2 is electrically coupled to the wiring pattern gp2 to which the ground potential is supplied. In such a transistor M2, whether or not the terminal dt2 and the terminal st2 are electrically coupled is switched according to the amplified control signal Lgd input via the wiring pattern p4. As described above, since the terminal st1 of the transistor M1 and the terminal dt2 of the transistor M2 are electrically coupled to the wiring pattern p3, the amplified modulation signal AMs, in which the voltage value changes between the voltage VHV and the ground potential based on the modulation signal Ms, is output to the wiring pattern p3.

Further, the terminal L1*a*, which is the other end of the inductor L1, is electrically coupled to the wiring pattern p3. The terminal L1*b*, which is one end of the inductor L1, is electrically coupled to the wiring pattern p5. Further, the external electrode Cta1, which is one end of the capacitor C1*a*, and the external electrode Ctb1, which is one end of the capacitor C1*b*, are coupled to the wiring pattern p5. As a result, the inductor L1 and the capacitors C1*a* and C1*b* form a low pass filter, and the drive signal COM in which the amplified modulation signal AMs is demodulated is output to the wiring pattern p5.

7. Operational Effect

In the liquid discharging apparatus 1 according to the present embodiment configured as described above, the demodulation circuit 560, which outputs the drive signal COM by demodulating the amplified modulation signal AMs, has the capacitor C1*a* and the capacitor C1*b* that are coupled in parallel. The capacitor C1*a* has a smaller change rate of the electrostatic capacitance when the direct-current voltage is supplied than that of the capacitor C1*b*, and the capacitor C1*b* has a smaller equivalent series resistance component than that of the capacitor C1*a*. As a result, in the combined capacitance in the demodulation circuit 560 that demodulates the amplified modulation signal AMs, even when the maximum voltage value of the drive signal COM is 25 V or larger for the purpose of acceleration of the image formation speed, and even when the frequency of the amplified modulation signal AMs is further increased at a viewpoint of improving the discharge accuracy, the possibility is reduced that the combined capacitance of the demodulation circuit 560 is significantly decreased. Therefore, it is possible to achieve both the acceleration of the image formation speed and the improvement of the discharge accuracy in the liquid discharging apparatus 1.

As mentioned above, although embodiments and modification examples are demonstrated, the present disclosure is not limited to these embodiment and modification examples and can be implemented in various modes without departing from the gist thereof, for example, embodiments and modification examples can be combined as appropriate.

The present disclosure includes configurations that are substantially the same as the configurations described in the embodiments and modification examples (for example, configurations that have the same functions, methods, and results, or configurations that have the same objects and effects). The present disclosure includes a configuration in which a non-essential part of the configuration described in the embodiments and the modification examples is replaced. The present disclosure includes a configuration that exhibits the same operational effects as the configuration described in the embodiments and the modification examples or a configuration that can achieve the same object. Further, the present disclosure includes a configuration in which a known technique is added to the configuration described in the embodiments and the modification examples.

The following contents are derived from the above-described embodiment.

One aspect of a liquid discharging apparatus includes: a drive signal output circuit outputting a drive signal that displaces between a first potential and a second potential that is lower than the first potential; and a discharging portion including a piezoelectric element that is driven based on the drive signal and discharging liquid by a drive of the piezoelectric element, in which the drive signal output circuit includes a modulation circuit that outputs a modulation signal obtained by modulating a base drive signal that is a base of the drive signal, an amplification circuit that outputs an amplified modulation signal obtained by amplifying the modulation signal, and a demodulation circuit that includes a first capacitor and a second capacitor and outputs the drive signal obtained by demodulating the amplified modulation signal, the first potential is 25 V or higher, the first capacitor and the second capacitor are coupled to each other in parallel, a change rate of an electrostatic capacitance of the first capacitor when a direct-current voltage is supplied to the first capacitor is smaller than a change rate of an electrostatic capacitance of the second capacitor when the direct-current voltage is supplied to the second capacitor, and an equivalent series resistance component of the second capacitor is smaller than an equivalent series resistance component of the first capacitor.

According to the liquid discharging apparatus, the demodulation circuit that outputs the drive signal obtained by demodulating the amplified modulation signal has the first capacitor and the second capacitor coupled to each other in parallel. The first capacitor has a smaller change rate of the electrostatic capacitance when the direct-current voltage is supplied than that of the second capacitor, and the second capacitor has a smaller equivalent series resistance component than that of the first capacitor. As a result, in the combined capacitance in the demodulation circuit that demodulates the amplified modulation signal, even when the maximum voltage value of the drive signal is 25 V or larger for the purpose of acceleration of the image formation speed, and even when the frequency of the amplified modulation signal is further increased at a viewpoint of improving the discharge accuracy, the possibility is reduced that the combined capacitance of the demodulation circuit is significantly decreased. Therefore, it is possible to achieve both the acceleration of the image formation speed and the improvement of the discharge accuracy in the liquid discharging apparatus.

In another aspect of the liquid discharging apparatus, the first capacitor may include a first laminated portion in which a resin thin film layer and a first metal thin film layer are laminated, and the second capacitor may include a second laminated portion in which a ceramic thin film layer and a second metal thin film layer are laminated.

According to this liquid discharging apparatus, even in a case where the first capacitor includes the first laminated portion in which the resin thin film layer and the first metal thin film layer are laminated, and the second capacitor includes the second laminated portion in which the ceramic thin film layer and the second metal thin film layer are laminated, it is possible to achieve both the high speed of image formation in the liquid discharging apparatus and improvement of discharge accuracy.

In still another aspect of the liquid discharging apparatus, the first capacitor may include a first electrode made of brass and electrically coupled to the first metal thin film layer, a second electrode made of copper and provided so as to cover the first electrode, and a third electrode made of tin and provided so as to cover the second electrode.

According to this liquid discharging apparatus, the reliability of the electrical coupling property between the metal thin film layer of the first capacitor and the substrate provided outside the capacitor is improved.

In still another aspect of the liquid discharging apparatus, a frequency of the amplified modulation signal may be 1 MHz or higher and 8 MHz or lower.

According to this liquid discharging apparatus, it is possible to improve the waveform accuracy of the drive signal output by the drive signal output circuit, reduce the loss in the amplification circuit, and reduce the power consumption in the drive signal output circuit.

In still another aspect of the liquid discharging apparatus, a frequency of the amplified modulation signal may be 1 MHz or higher and 4 MHz or lower.

According to this liquid discharging apparatus, it is possible to improve the waveform accuracy of the drive signal output by the drive signal output circuit and further reduce the loss in the amplification circuit.

Still another aspect of the liquid discharging apparatus may further include a carriage reciprocating along a main scanning direction that intersects a transporting direction in which a medium is transported, in which the drive signal output circuit and the discharging portion may be mounted on the carriage.

According to this liquid discharging apparatus, since the first capacitor includes the laminated portion in which the resin thin film layer and the metal thin film layer are laminated, the possibility that the voltage values at the both ends of the first capacitor fluctuate due to the vibration generated by the movement of the carriage is reduced. As a result, even when the drive signal output circuit is mounted on the carriage, the possibility is reduced that the waveform accuracy of the drive signal is decreased.

Still another aspect of the liquid discharging apparatus may further include a substrate on which the drive signal output circuit is mounted, in which the first capacitor and the second capacitor may be provided on the same mounting surface of the substrate.

According to this liquid discharging apparatus, by providing the first capacitor and the second capacitor on the same mounting surface, it is possible to improve the manufacturing efficiency of the drive signal output circuit.

In still another aspect of the liquid discharging apparatus, the modulation circuit, the amplification circuit, and the demodulation circuit, which includes the first capacitor and the second capacitor, may be provided on the same mounting surface of the substrate.

According to this liquid discharging apparatus, the manufacturing efficiency of the drive signal output circuit can be improved by providing the first capacitor and the second capacitor on the same mounting surface as the modulation circuit and the amplification circuit.

What is claimed is:

1. A liquid discharging apparatus comprising:

a drive signal output circuit outputting a drive signal that displaces between a first potential and a second potential that is lower than the first potential; and a discharging portion including a piezoelectric element that is driven based on the drive signal and discharging liquid by a drive of the piezoelectric element, wherein the drive signal output circuit includes a modulation circuit that outputs a modulation signal obtained by modulating a base drive signal that is a base of the drive signal, an amplification circuit that outputs an amplified modulation signal obtained by amplifying the modulation signal, and a demodulation circuit that includes a first capacitor and a second capacitor and outputs the drive signal obtained by demodulating the amplified modulation signal, the first potential is 25 V or higher, the first capacitor and the second capacitor are coupled to each other in parallel, a change rate of an electrostatic capacitance of the first capacitor when a direct-current voltage is supplied to the first capacitor is smaller than a change rate of an electrostatic capacitance of the second capacitor when the direct-current voltage is supplied to the second capacitor, and an equivalent series resistance component of the second capacitor is smaller than an equivalent series resistance component of the first capacitor.

2. The liquid discharging apparatus according to claim 1, wherein the first capacitor includes a first laminated portion in which a resin thin film layer and a first metal thin film layer are laminated, and the second capacitor includes a second laminated portion in which a ceramic thin film layer and a second metal thin film layer are laminated.

3. The liquid discharging apparatus according to claim 2, wherein the first capacitor includes a first electrode made of brass and electrically coupled to the first metal thin film layer, a second electrode made of copper and provided so as to cover the first electrode, and a third electrode made of tin and provided so as to cover the second electrode.

4. The liquid discharging apparatus according to claim 1, wherein a frequency of the amplified modulation signal is 1 MHz or higher and 8 MHz or lower.

5. The liquid discharging apparatus according to claim 1, wherein a frequency of the amplified modulation signal is 1 MHz or higher and 4 MHz or lower.

6. The liquid discharging apparatus according to claim 1, further comprising:

a carriage reciprocating along a main scanning direction that intersects a transporting direction in which a medium is transported, wherein the drive signal output circuit and the discharging portion are mounted on the carriage.

7. The liquid discharging apparatus according to claim 1, further comprising:

a substrate on which the drive signal output circuit is mounted, wherein the first capacitor and the second capacitor are provided on the same mounting surface of the substrate.

8. The liquid discharging apparatus according to claim 7, wherein the modulation circuit, the amplification circuit, and the demodulation circuit, which includes the first capacitor and the second capacitor, are provided on the same mounting surface of the substrate.

* * * * *